(12) United States Patent
Santeufemia et al.

(10) Patent No.: US 7,711,605 B1
(45) Date of Patent: May 4, 2010

(54) ADULT DIGITAL CONTENT MANAGEMENT, PLAYBACK AND DELIVERY

(76) Inventors: Michael N. Santeufemia, 684 Morningside La., Grosse Pointe Woods, MI (US) 48236; Christopher John Moulios, 19340 Calle de Barcelona, Cupertino, CA (US) 95014

( * ) Notice: Subject to any disclaimer, the term of this patent is extended or adjusted under 35 U.S.C. 154(b) by 1454 days.

(21) Appl. No.: 11/026,861

(22) Filed: Dec. 30, 2004

Related U.S. Application Data

(60) Provisional application No. 60/534,494, filed on Jan. 6, 2004.

(51) Int. Cl.
*G06Q 30/00* (2006.01)

(52) U.S. Cl. .................. 705/26; 705/1; 705/27

(58) Field of Classification Search ............ 705/26, 705/27
See application file for complete search history.

(56) References Cited

U.S. PATENT DOCUMENTS

| | | | |
|---|---|---|---|
| 5,715,314 A | 2/1998 | Payne et al. | |
| 5,724,424 A | 3/1998 | Gifford | |
| 5,960,411 A | 9/1999 | Hartman et al. | |
| 6,609,113 B1 | 8/2003 | O'Leary et al. | |
| 6,670,537 B2 | 12/2003 | Hughes | |
| 6,671,681 B1 | 12/2003 | Emens et al. | |
| 6,959,861 B1 * | 11/2005 | Walters | 235/380 |
| 7,080,030 B2 * | 7/2006 | Eglen et al. | 705/26 |
| 2002/0095386 A1 * | 7/2002 | Maritzen et al. | 705/64 |
| 2003/0079133 A1 * | 4/2003 | Breiter et al. | 713/182 |
| 2003/0131252 A1 * | 7/2003 | Barton | 705/59 |
| 2003/0225796 A1 | 12/2003 | Matsubara | |
| 2004/0078293 A1 * | 4/2004 | Iverson et al. | 705/27 |
| 2004/0123129 A1 * | 6/2004 | Ginter et al. | 713/193 |
| 2004/0220791 A1 * | 11/2004 | Lamkin et al. | 703/11 |

OTHER PUBLICATIONS

Chips with everything: Sexy computers, microscopes for atoms and personal tracking devices in the palm of your hand. Jim McClellan, The Observer, Mar. 31, 2002.*

* cited by examiner

*Primary Examiner*—Jason Dunham
(74) *Attorney, Agent, or Firm*—Dobrusin & Thennisch PC

(57) ABSTRACT

An electronic information system and method pursuant to which at least one user interface is adapted for interaction with a user; at least one database comprising adult digital content associated with a server is remotely accessible and accessed by the user, and a network provides remote access to the at least one database to enable downloading of adult digital content.

18 Claims, 24 Drawing Sheets

Fig. 3C

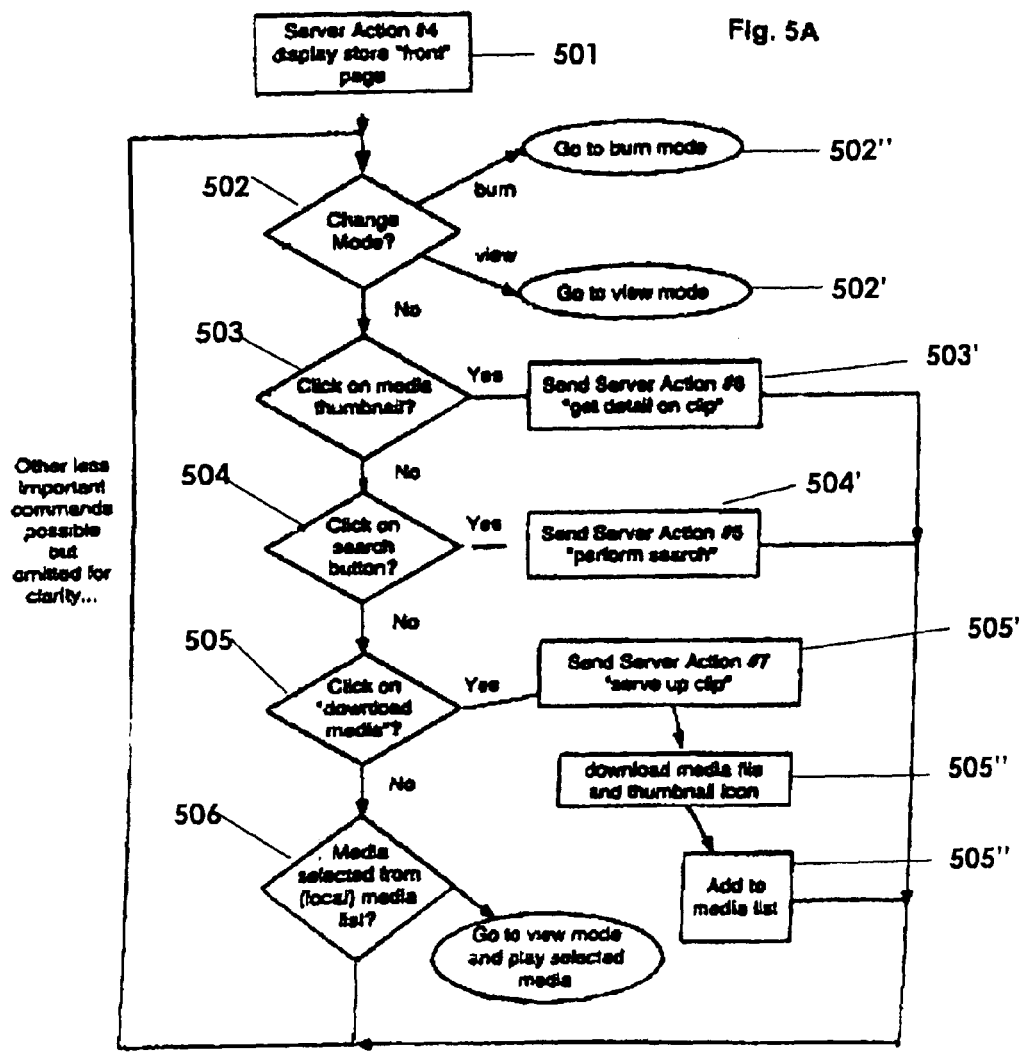

ADULT DIGITAL CONTENT MANAGEMENT, PLAYBACK AND DELIVERY

This application claims the benefit of U.S. Provisional Application No. 60/534,494, filed on Jan. 6, 2004, the contents of which are expressly incorporated herein.

TECHNICAL FIELD

The present invention pertains to an improved method, software and system for managing, sharing and distributing electronic information and particularly electronic files including adult digital content.

BACKGROUND

The growth and widespread use of the Internet in recent years has made it possible for large volumes of digital content to be available for user review. One particular field of content, adult digital content, has yet to see a convenient approach to enabling users to search for, access, download and organize libraries of files. Adult digital content presents unique issues as compared with other content types, such as music. For example, users often desire to remain anonymous. Additionally, there is an undesirably large volume of junk e-mail or "spam" that is generated when a user accesses an adult website. Adult digital content also tends largely to comprise images or video files, and thus commands the ability of a system to manage large scale volumes of data. There is thus a need for an improved method, software and system for managing, sharing and distributing electronic information and particularly electronic files including adult content.

SUMMARY OF THE INVENTION

The present invention meets one or more of the above needs by providing an electronic information system comprising at least one user interface adapted for interaction with a user; at least one database associated with a server that is remotely accessible by the user, the database comprising adult digital content; and a network for providing remote access to the at least one database by the user to enable downloading of the adult digital content.

For meeting one or more of the above needs, the software and method of the present invention further contemplates a method for accessing adult content electronic information, comprising the steps of providing a user interface to a user over a network; maintaining a database of adult digital content; granting access to the user to the database for allowing the user to sample the adult digital content and select content for downloading by the user to a storage medium; and transferring the digital content to the user for downloading by the user, and any possible viewing by the user, particularly at the user's convenience.

DETAILED DESCRIPTION

Figure 1:
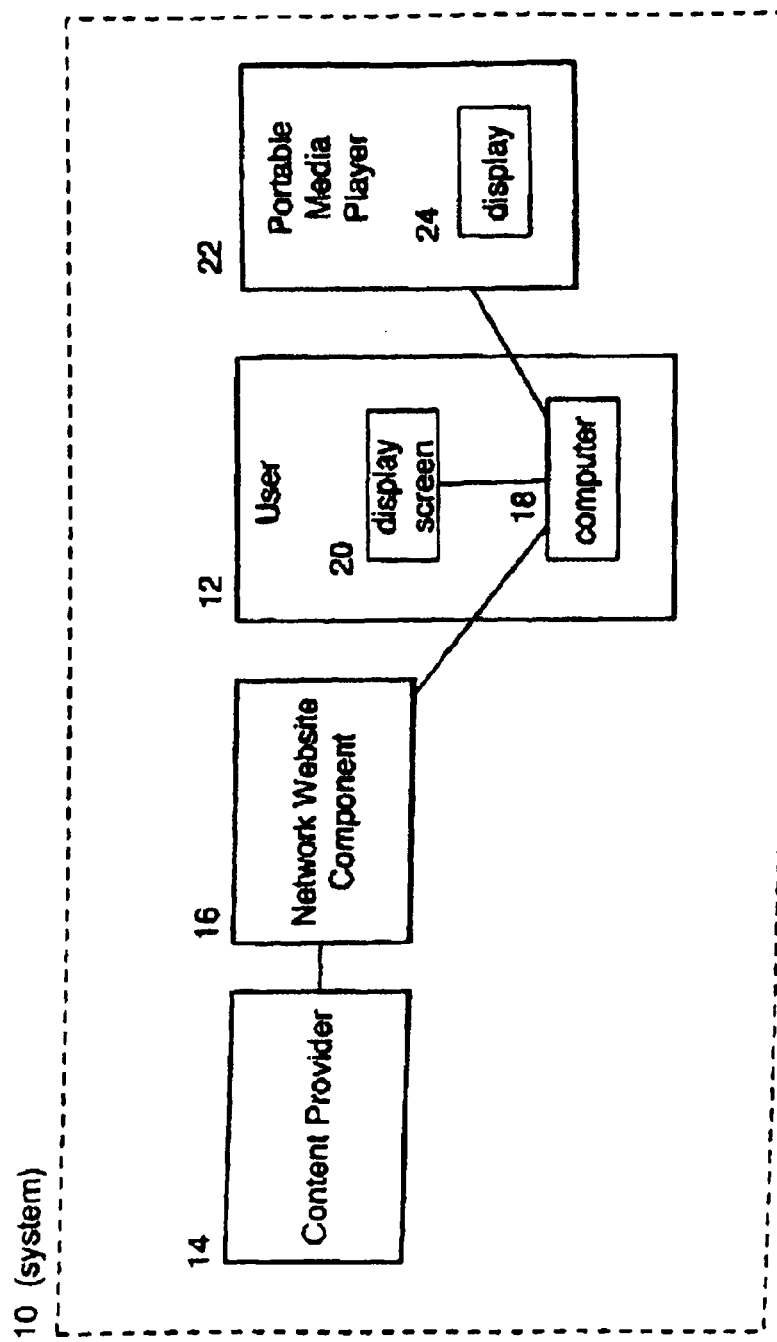
FIGS. 1 and 2 are schematic block diagrams illustrating possible systems of the present invention.

As described herein, in accordance with the present invention, a "network" shall include any one or more networks that covers any geographical area, such as a local area network, wide area network, regional network, global network (e.g., The World Wide Web or Internet) or any combination thereof. Networks may be hardwired (e.g., via conductive wire, fiber optics or otherwise), wireless (e.g., via electromagnetic radiation such as used in cellular systems, or other personal or satellite communication systems), or a combination thereof.

In accordance with the present invention, a "website" typically refers to one or more files or other digital information maintained on one or more computers, such as web servers, and being accessible over a network, such as the Internet, via suitable protocol. For example, a file might be accessed by sending a message with a suitable internet protocol, such as hypertext transfer protocol (HTTP) request that recites a uniform resource locator (URL) where a file or other digital content is located or otherwise managed. Such files and content can include, for example, hypertext markup language (HTML) files, common gateway interface (CGI) files, Java applications, or otherwise. A website typically will include a home page to provide access to the files and content maintained within the website, such as at web pages (which typically will include, for example, video recordings, photographs, audio recordings, animations, text, spreadsheets, presentations or any combination thereof, any or all of which may be static, dynamic or a combination thereof).

"Adult digital content" as used herein shall refer to files, links, or other electronic information providing a user with embody video recordings, photographs, audio recordings, animations, text, spreadsheets, presentations, any combination thereof, or other depictions that pertain generally to subject matter considered appropriate for observation by persons having a mature emotional development. Adult digital content thus may encompass graphic depictions of acts of physical violence, one or more adults engaging in acts of self gratification, consensual acts of explicit sexual activity, or both, at least partially unclothed models, subject matter for which the Motion Picture Association of America would deem inappropriate for viewing by persons under 17 years of age (e.g., R or NR ratings, or a television TV MA rating), crude indecent language or any combination thereof.

"Computers" herein shall refer to any processor controlled device that permits access to a network, such as the Internet, including for example personal computers (whether desktop, mobile or other), workstations, servers, networks of individual computers, hand-held devices (e.g., personal digital assistants), set top boxes for viewing appliances, interactive kiosks, web-enabled wireless communications devices, mobile web browsers, or any combination thereof. These computers will typically include or be in operational communication with a suitable addressable storage medium or computer accessible medium, such as one or more memories selected from a random access memory (RAM), programmable read-only memory (PROM), erasable programmable read-only memory (EPROM), electronically erasable programmable read-only memory (EEPROM), or any combination thereof. Memory may be comprised in any suitable storage device such as a hard disk, a floppy disk, a DVD, a CD, a magnetic recording tape, an optical recording device, a memory card, a memory stick, a flash storage medium, a memory key device, or any combination thereof.

In one embodiment, the computers are equipped with a network communication device such as a modem, a network or other interface card, or other network connection device. The computers execute any appropriate operating system, which itself may include a suitable communications protocol for messaging over the Internet. The operating system may also provide appropriate communications protocols to establish communication links with the Internet.

The computers generally will contain program logic or the like for representing data and instructions to govern computer operation. The program logic may be implemented as one or more object frameworks or modules that reside on an addressable storage medium and execute on at least one processor. The frameworks or modules may include components such as hardware and/or software components, object-oriented software components, class components, task components, drivers, firmware, microcode, circuitry, segments of program code or any other subject matter for processing procedures, subroutines, functions, attributes, data, databases, data structures, tables, arrays, variables, or any combination thereof.

Referring to FIG. 1, one illustrative system 10 of the present invention includes a user component 12, a content provider (which may be a content originator) component 14, and a network website component 16. The user component 12 will typically include at least one computer 18, which has a display screen 20. The computer itself might be a portable (e.g., handheld) media player or, as in FIG. 1, it may be another type of computer and include an optional portable (e.g., handheld) media player 22 that is be signally connectable with the computer for synchronizing the content of the portable media player 22 with the content of the computer 18.

Ordinarily, a user will be able to enter commands and information into the computer 18 through one or more suitable input devices such as keyboard, pointing device, touch screen or any combination thereof. Other input devices may include (without limitation) a joystick, microphone, camera, fax device, game controls, scanner, bar code reader, radiofrequency identification device transponder, any combination thereof or the like. These and other input devices are often connected to the computer through an interface, such as a serial port interface coupled to a system bus, but may be connected by other interfaces, such as a parallel port, game port, or a universal serial bus (USB). Wireless communication connections are also possible. One or more display devices 24 may also be associated with the user component 12, via the computer, the portable media player or both, pursuant to which the user will be able to interact with one or more user interfaces. In addition to the graphical display device, there may be other peripheral output devices such as speakers, printers or otherwise. The computer will be signally connected (hardwired, by wireless, or a combination thereof) to a network (e.g., the Internet) through a suitable network interface, adapter, a modem, or other means for establishing communications, over the network.

The network website component, the content provider component, or a combination of the two (e.g., in instances where the content provider is also the entity that runs the website) typically will include at least one server computer that is also signally connected (hardwired, by wireless, or a combination thereof) to the network (e.g., the Internet) through a suitable network interface, adapter, a modem, or other means for establishing communications, over the network.

Accordingly, it is contemplated that a user can remotely access, view, and/or manage adult digital content maintained at the network website component, the content provider component, or a combination of the two, from a computer of the user component, and shall be able to download files or link to files that are stored at the network website component, the content provider component, or a combination of the two.

One attractive benefit of the present invention resides in its feature of providing an approach for searching a plurality of adult digital content resources on a network such as the Internet with as little as one search query or menu selection made by a user. To do this the network website component advantageously maintains (and optionally periodically updates) a database of adult digital content available from numerous content providers on the network (whether simultaneously or selectively based upon user selection criteria) and provides a method for acquiring the content, viewing it and/or managing it.

The present invention thus provides "one-stop" shopping for the user, and avoids the hassles common to users from the nuances of accessing, searching and retrieving information via various non-uniform methods currently employed in the adult digital content field. Thus pursuant to one aspect of the system and method of the present invention, the user may, with a single search, acquire a comprehensive list of available resources on a desired adult digital content topic. The user may then access the adult digital content directly through a "seamless" interface, purchase the right to download the adult digital content, download the adult digital content, view the adult digital content and optionally transfer the adult digital content to a suitable storage medium such as disclosed above (e.g., a handheld or other portable media player, a DVD, a CD or the like), enabling the user to view the adult digital content at the convenience of the user.

The databases of the present invention are typically maintained in the network component (e.g., via at least one computer server associated with the network component), but may also have sub-components maintained by a content provider, by a user or both. The databases may be of any suitable architecture, whether object based, relation based, a combination thereof or otherwise. The databases herein contemplate not only a single database, but may include plural databases maintained at the same or at remote locations relative to each other, but which are accessible to a user. The database may include entire files, portions of files, links to files or other information. Thus it is possible that files will remain stored on a server controlled by a content provider and the website of the present invention is used merely as a portal for access to the content provider. The database may include one or a plurality of tables, and may be searchable by topic, key word, text (e.g., Boolean or free form), file directory display, links, menu (e.g., dropdown menu) any combination thereof or otherwise.

In another aspect of the present invention there is contemplated not only a vehicle for providing users with access to adult digital content, but also a vehicle for purchasing goods or services such as for use in enjoyment of the adult digital content. In this regard, it is contemplated also that the network component host will offer a storefront to enable purchase of a variety of goods via the network, such goods being offered for sale either by the network component host, a third party vendor, a combination thereof or otherwise, and thus available for shipment via courier (e.g., postal service, express courier or otherwise). Examples of such goods may include, without limitation, cameras, clothing, toys, novelty items, magazines, books, home appliances, portable media players, other electronic devices, health and beauty aids, dietary supplements, combinations thereof or otherwise. Examples of services include adult entertainment, escort services, or the like.

In accordance with one illustration of the methods of the present invention, the network component of the present invention shall function to interact with information provided by a user and perform the steps of creating a new user (if a first time user is detected) or authenticating a prior user logging in with a unique identifier (e.g., a password, with an option to send such user a reminder if the identifier is forgotten or misplaced, such as a password reminder email message); providing at least one user interface page; providing the user one or more options for searching; retrieving search results from at least one data base and providing the results to the user; and offering the user an opportunity to acquire a download of a file based upon the search results. In a more particular aspect, based upon results from a search, a user may be provided with a thumbnail image or other depiction representative of one or more available files. A user may select such file for downloading based upon the depiction. Optionally, the user is provided with more detailed summary information about the clip, an opportunity to view at least a portion of the file or a combination thereof. When satisfied with the selection, or prior thereto, the method and system of the present invention contemplates consummating a transaction that includes the user purchasing a right to download the file. The user may optionally also be provided with a display of the user's history of viewing selections, downloads or both, with the ability to access such selections, downloads or both for further viewing.

In this regard, the user component of the invention typically will be constructed to perform the steps of browsing directories provided by at least one network component server, establishing a secure connection via a network, optionally affording anonymity for a user, creating individualized or local directories on a user computer; cataloging files on a user computer; downloading files; creating file links; deleting files; organizing files; consummating a sales transaction to purchase rights to access or download a file, to purchase goods via a virtual storefront provided by a network component server, or both; synchronizing with another device (e.g., as with other handheld embodiments herein, a handheld or other portable media player having suitable memory capacity (such as at least 10 gigabytes, 20 gigabytes, or even 50 gigabytes or more), examples of which (without limitation) include the LYRA™ device from RCA, the Archos AV300 series, a Microsoft Portable Media Center, or the like) or any combination of the foregoing.

It should be appreciated that reference to "files" herein shall include a plurality of files (if necessary to complete an entire work), and may also contemplate portions of files. File format is not critical. They may be compressed or streaming. In one particular and generally surprising approach, however, MPEG-1 files are employed, even though it is recognized that more modern formats are available and may suitably be employed. Files can be encrypted or not, and commonly will have unique identifier associated with them for permitting access and retrieval. Files will typically include previously recorded adult digital content, but may also include simulcast content. Files may be transmitted in any suitable manner.

As appreciated from the above, use of the present invention generally will include a payment requirement to the network website host. In one approach, a user will be able to purchase a subscription (whether for an initial fee, a periodic fee, a combination thereof or otherwise), which will entitle the user to a predetermined amount of database access, downloads, access time, any combination thereof or otherwise. A user might be able to purchase access, downloads, time, any combination thereof or otherwise on an "as needed" basis (e.g., by paying a fee based upon time of download, size of file, numbers of files, or any combination thereof). Combinations of the above are also contemplated. In addition, it is possible that users will be offered at least partially free use of the present invention by the network website host. In the latter instance, it is also likely that a content provider will require payment by the user.

The invention also contemplates providing an approach to establishing a customer account for consummating transactions, with an option to store identifying information, credit card information or other information. In this regard, a user can maintain a balance of money or other credit into an account and subsequently debit against the account balance. The user also can have the option of paying for each individual transaction by providing credit or debit card information at the time of transaction. Any combination of the above is also possible. Other illustrations of effectuating an electronic payment using an Electronic Funds Transfer (EFT) network (such as the Automated Clearing House (ACH) network) are disclosed, for example, in U.S. Pat. No. 6,609,113 (O'Leary et al); U.S. Pat. No. 5,960,411 (Hartman et al.); U.S. Pat. No. 5,715,314 (Payne et al.); and U.S. Pat. No. 5,724,424 (Gifford).

Figure 2:
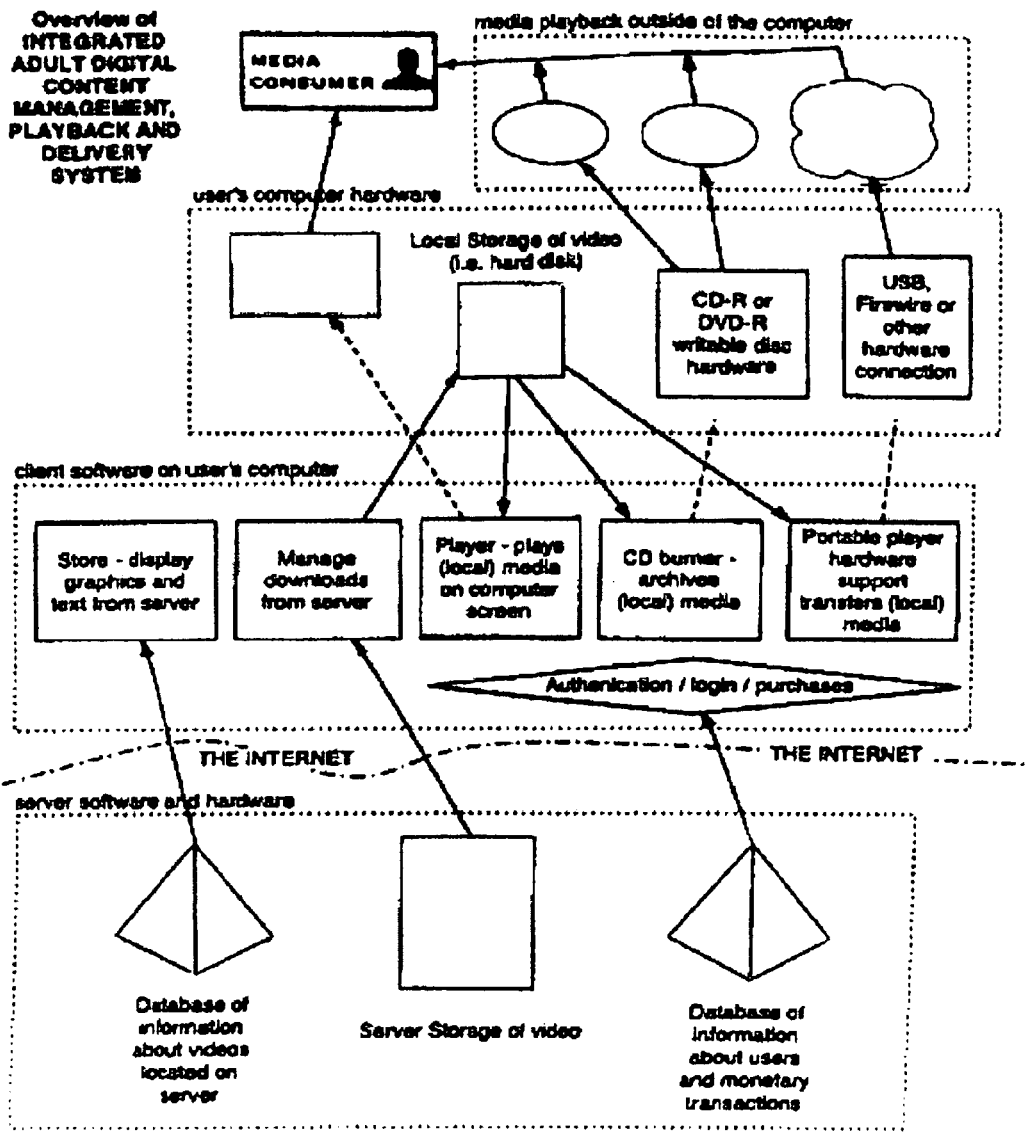

FIG. 2 provides a more elaborate illustration of one possible embodiment for the architecture of a system according to the present invention. Methods for use of such a system and others within the scope of the present invention are also described in further detail with reference to the accompanying FIGS. 3A-7B.

Figure 3A:
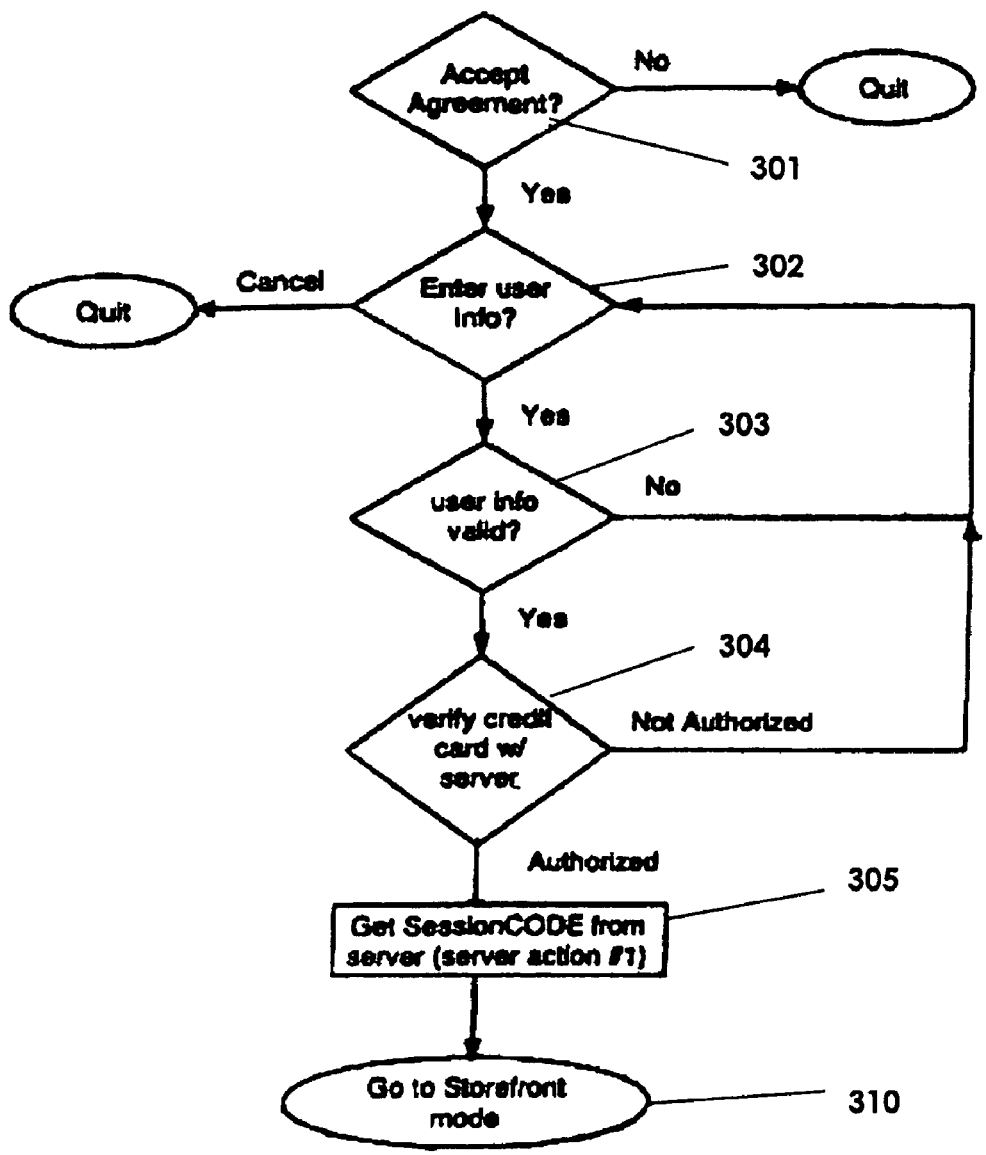
FIGS. 3A-17 are either flow diagrams or sample interfaces illustrating various methodologies that may be employed in accordance with the present invention.
Figure 3B:
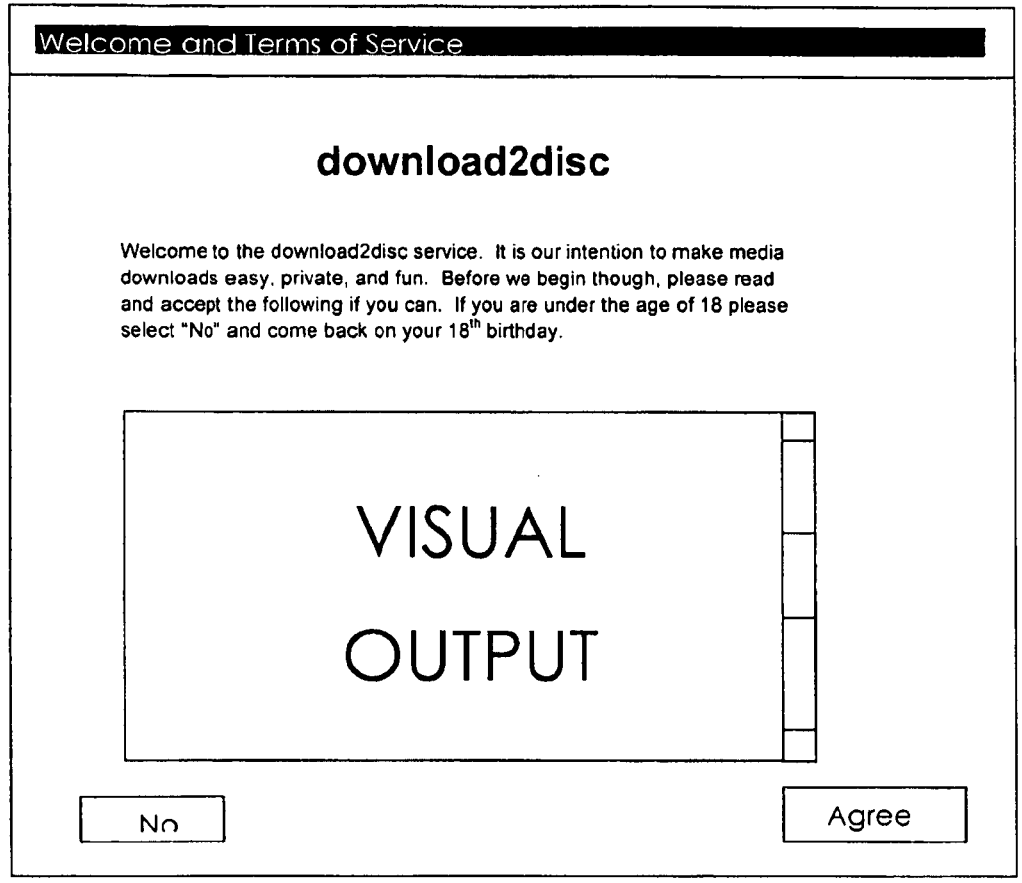
Figure 3C:
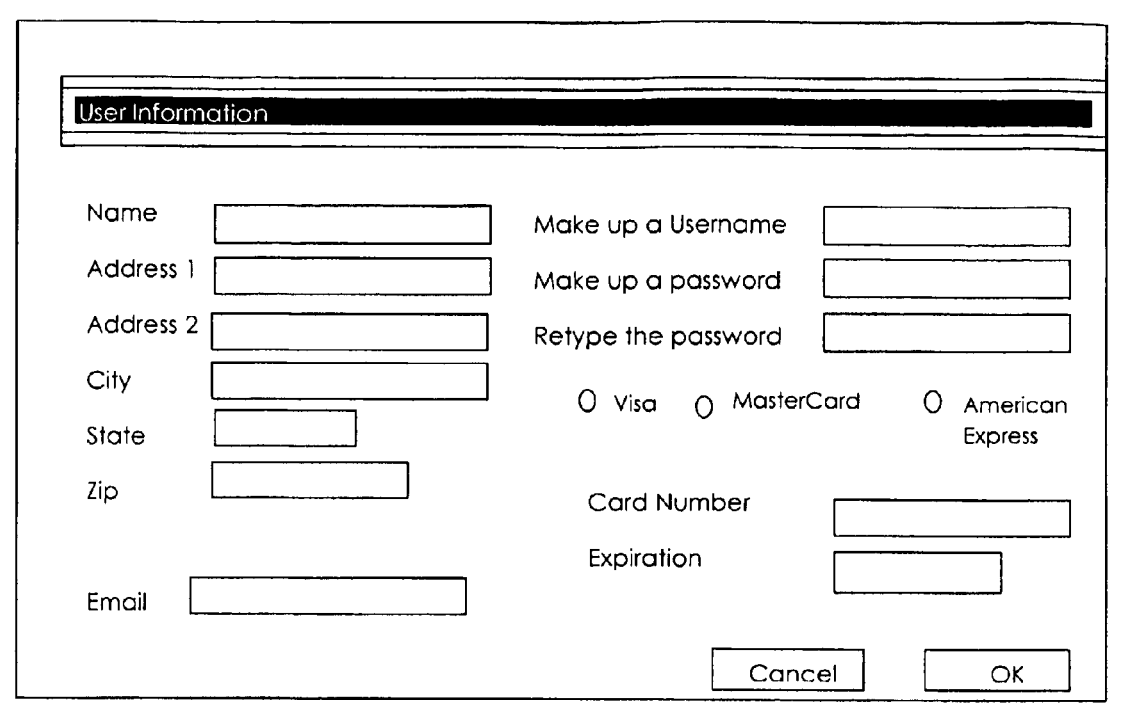

FIG. 3A illustrates a method by which first time users, users without an existing account or other users are granted access to adult digital content. In an initial step 301, a user will be presented with a terms and conditions of use agreement, such as shown in the screen of FIG. 3B. If the user does not agree, operation will cease, and no access will be granted. If the user agrees, a next step 302 provides the user with an interface for inputting personal information, such as in FIG. 3C.

Figure 3D:
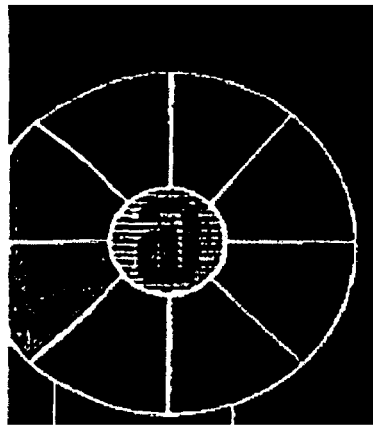

FIG. 3D illustrates an example of a homepage associated with a website for use of the method and system of the present invention. (which itself may including one or more links, directories or the like for facilitating navigation).

If the user elects not to complete the information requested, operation also will cease, and no access will be granted. In another step 303, a server of the network component will verify whether user information is valid and authorized, such as by confirming with a credit card company (step 304). Of course if steps 303 or 304 show the user as not authorized, operation will cease, and no access will be granted. Assuming the user is authorized, a step 305 contemplates further activity by a server of the network component toward granting access to the site, and will typically include a step of displaying another interactive interface for the user, such as by providing at least one storefront interface page. The steps of FIG. 3A (as well as that of FIG. 4A addressed below) could also include one or more additional steps such as offering a user a function of remembering a password, establishing one or more accounts, referring others to the site, offering discounts or coupons, or the like.

Figure 4A:
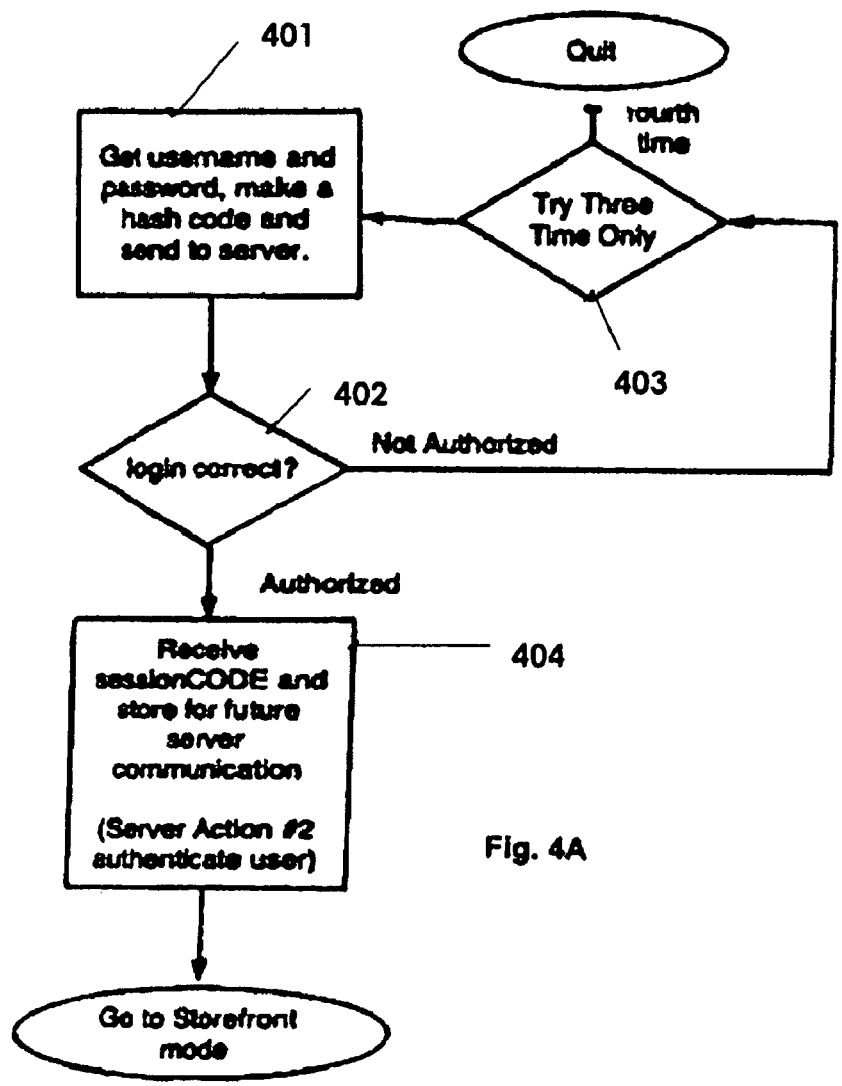
Figure 4B:
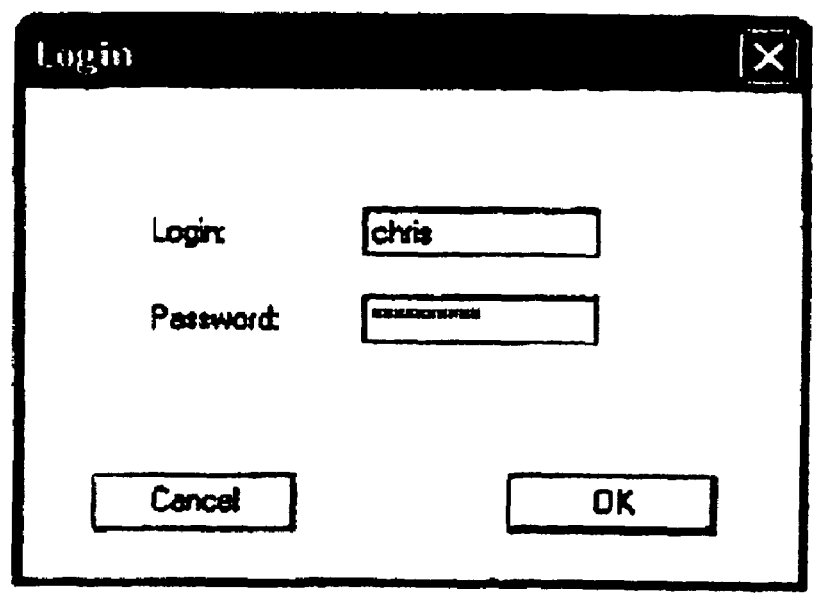

Alternatively, FIG. 4A illustrates a sequence of steps that might be employed to grant access to previous users having a login identifier. In an initial step 401, the user is presented with a screen, such as that in FIG. 4B, which allows the user to log into the site. In a comparison step 402, user input is compared with data stored by the network component to assure authenticity. One approach may include a step 403 by which if a user makes repeated unsuccessful efforts to log into the site, operation will cease, and no access will be granted. Assuming the user successfully logs in, a step 404 contemplates further activity by a server of the network component toward granting access to the site, and will typically include a step of displaying another interactive interface for the user, such as by providing at least one storefront interface page.

Figure 5B:
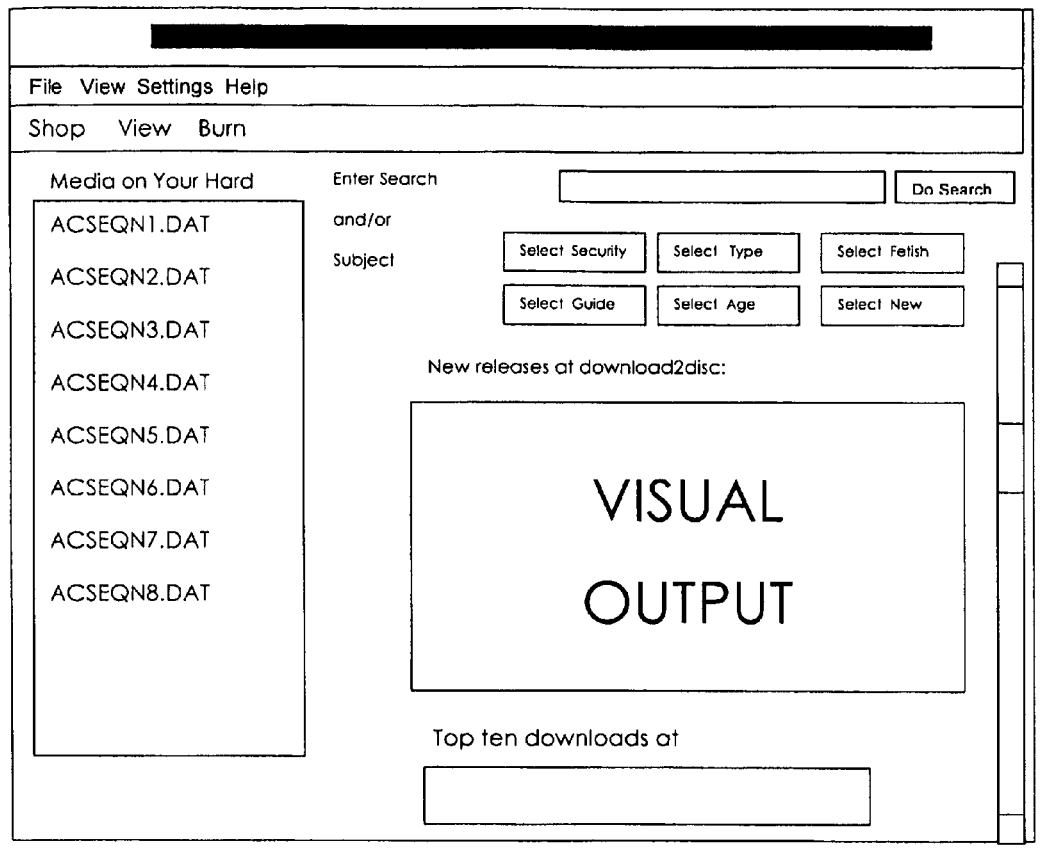

Turning to FIG. 5A, per step 501 a user is presented with at least one storefront interface page by which the user is presented with content that the user can review, purchase rights to download, download or any combination thereof. FIG. 5B illustrates one example of such an interface, which could include one or more menus, directories, thumbnail images, enlarged images, tool bars (e.g., to facilitate navigation through the site, to facilitate downloading, to facilitate purchases or any combination thereof), searching tools, merchandise displays, or any combination thereof.

When using the storefront interface, the user thus will be offered one or more of the ability to perform a selection step 502 of whether to view such as per 502', to download as per 502" or both; to perform a viewing step 503 (which if selected will trigger a network component server, such as per step 503'; to obtain and play the clip, present summary information about the clip, a combination thereof or otherwise); to perform a searching step 504 (which if selected will trigger a network component server, such as per step 504' to afford access to one or more databases for searching); perform a downloading step 505 (which if selected will trigger a network component server, such as per step 505' to obtain a file and present it to the user for downloading, optionally with or without a thumbnail icon (such as per step 505"), and optionally with a step (such as per step 505''') of adding information about the selection to a catalog); to perform a selection step 506 from a provided list, which optionally may be a catalog list that is maintained personally by the user (in which case the user is provided viewing access to the selection); or to perform any combination of the aforenoted steps. Of course other functions may be performed using the storefront interface, and functions mentioned in the above may be omitted as well.

Figure 6A:
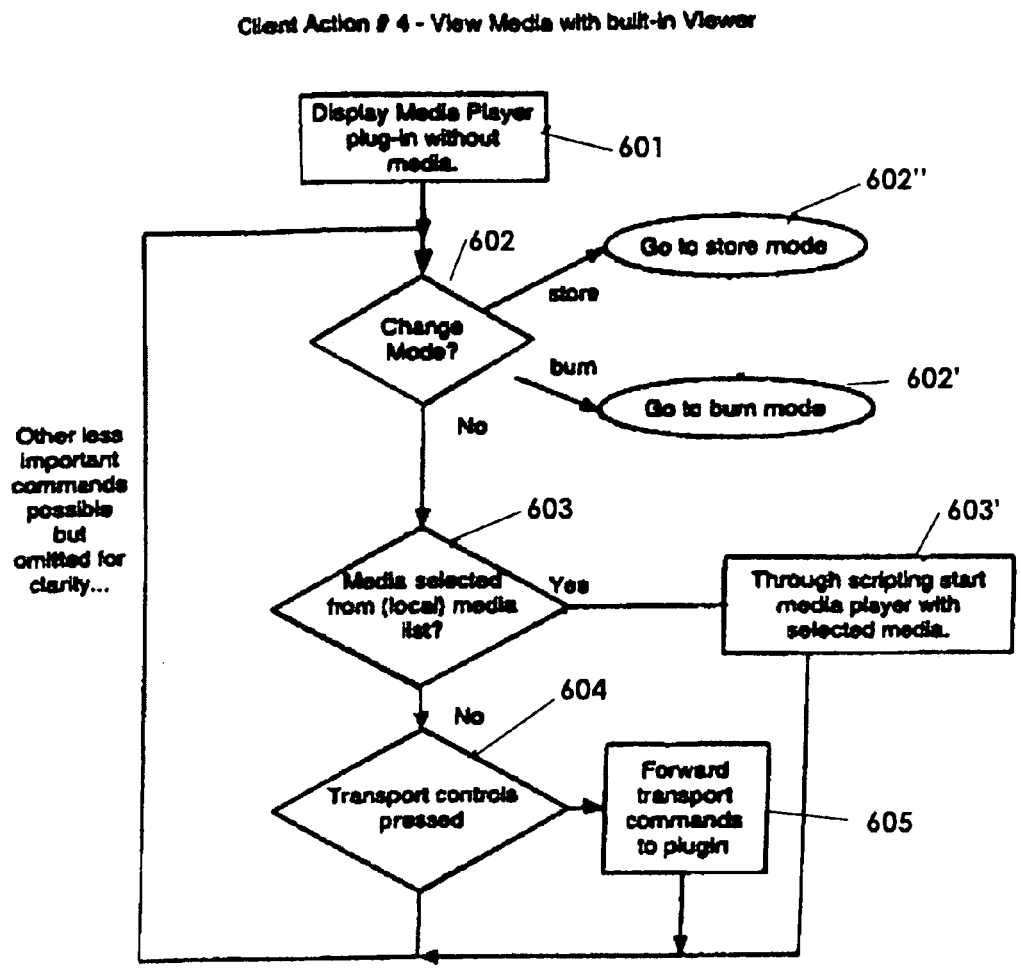
Figure 6B:
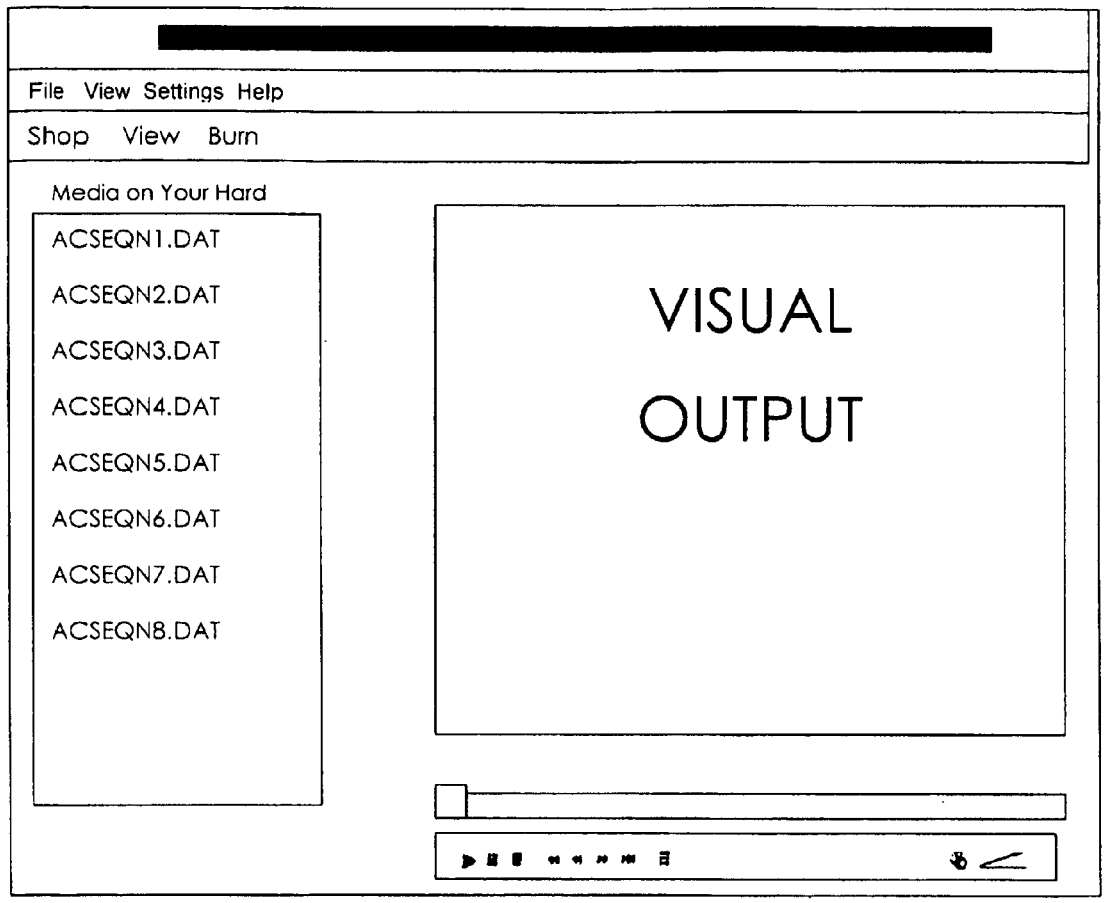

Referring to FIG. 6A, there is illustrated an operation for viewing adult digital content by the user. Under this approach, following the selection step 601, a digital media player is offered to the user, for local viewing by the user, or by a server of the network component. An example of an interface a user might obtain upon accessing such a player is shown in FIG. 6B. For example, as seen in FIG. 6B, such interface may include buttons and controls and a suitable viewing screen for the media.

A user is then provided with options for operating the player. For example, a user may employ a step 603 "double clicking an entry in the list" to start playback of the media (step 603'). Or by accessing the transport controls as in step 604, (e.g., forward, rewind, play, record, stop, pause or the like are accessed), the media player component is forwarded the appropriate command message as documented in step 605.

Figure 7A:
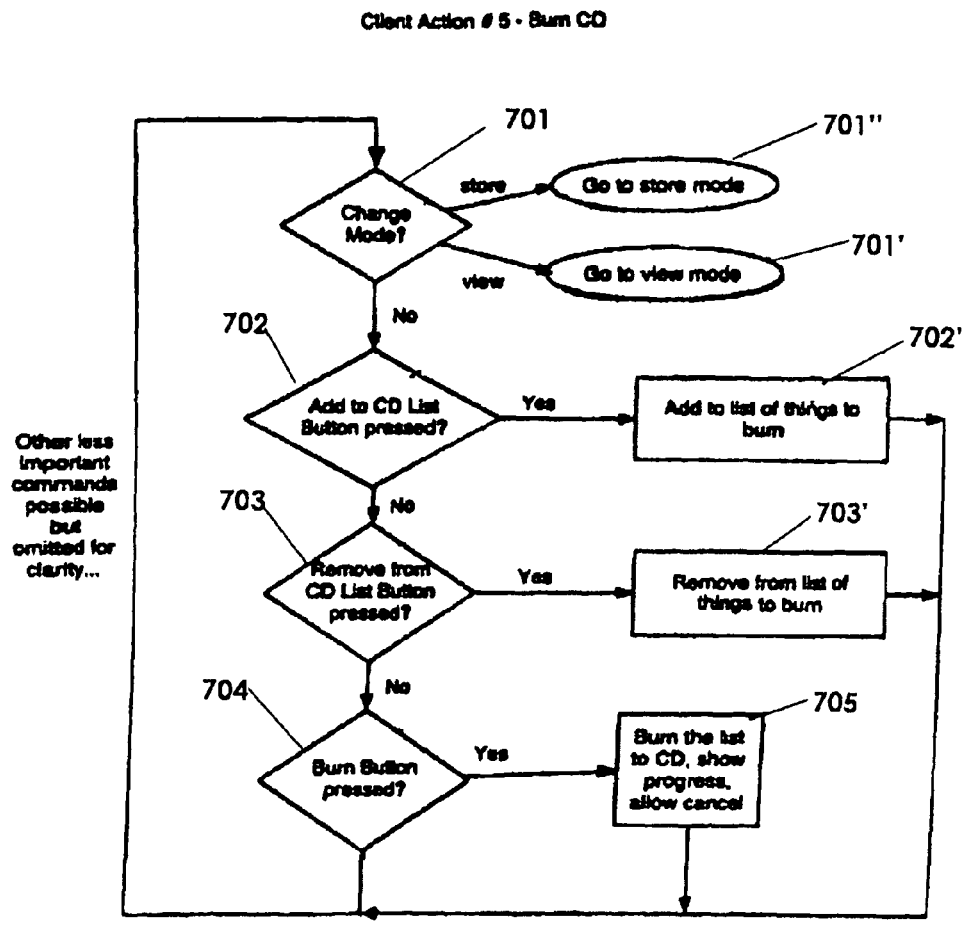
Figure 7B:
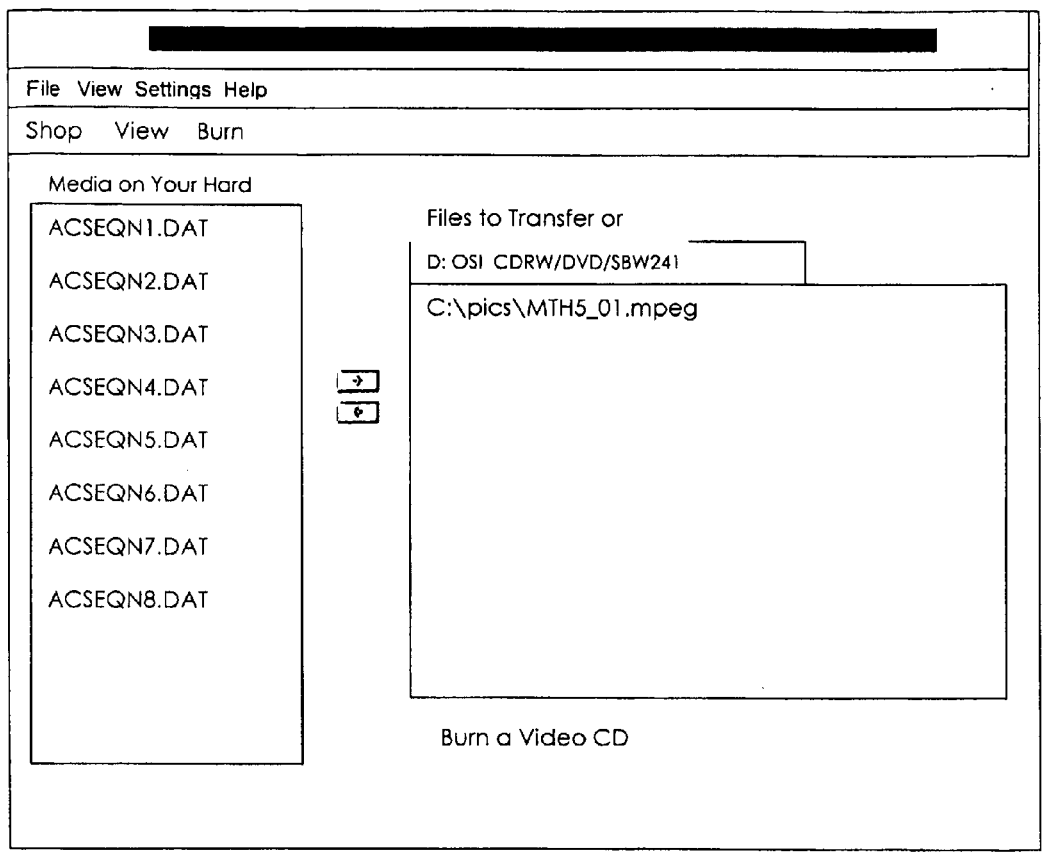

Turning to FIG. 7A, there is illustrated a possible approach for facilitating the archiving of an adult digital content file onto CD-R or DVD-R or other storage mediums in accordance with the present invention. Under this approach a user is again provided a step 701 of choosing whether the user wishes to change modes and view videos such as per 701' or return for additional shopping to another storefront interface such as per step 701". It should be realized that the steps of changing a mode of operation of the system, such as the above steps 502, 603 and 701 (and any other like step discussed herein) might be manifested through a tool bar, icon or other functional navigation tool, which may be always present, thus enabling the user to escape an operation by selecting that tool. Assuming the user elects to transfer a file or "burn" it to a disc, the user may then be afforded options for adding (step 702) a selection to a list for archiving (in which case the selection is added (step 702'), removing (step 703) a selection from a list for burning (in which case the selection is removed (step 703'), or both. In this manner, a plurality of selections may be added to the burn list in a single step. Upon completing a list, or an individual selection (as the case may be) the user will then perform a command (step 704) to cause the system to start the process of "burning" a disc or otherwise initiating the archival process (step 705) from the selection or list of selections to a location designated by the user. It should be realized that, as with other functions of the system herein, one or more of the functions performed in accordance with these steps may be controlled by suitable software local to a user computer, by software is associated with a server of the network component or a combination thereof. FIG. 7B is an example interface.

FIGS. 8-17 illustrate steps that a server associated with a network component of the present invention might employ combinations of any two or more of the steps of creating a session, creating a new user, authenticating a user login, sending a password reminder, returning a front page, performing a database search, serving up at least one adult digital content, serving up a data description page, and repeating a serve up of a file.

Figure 8:
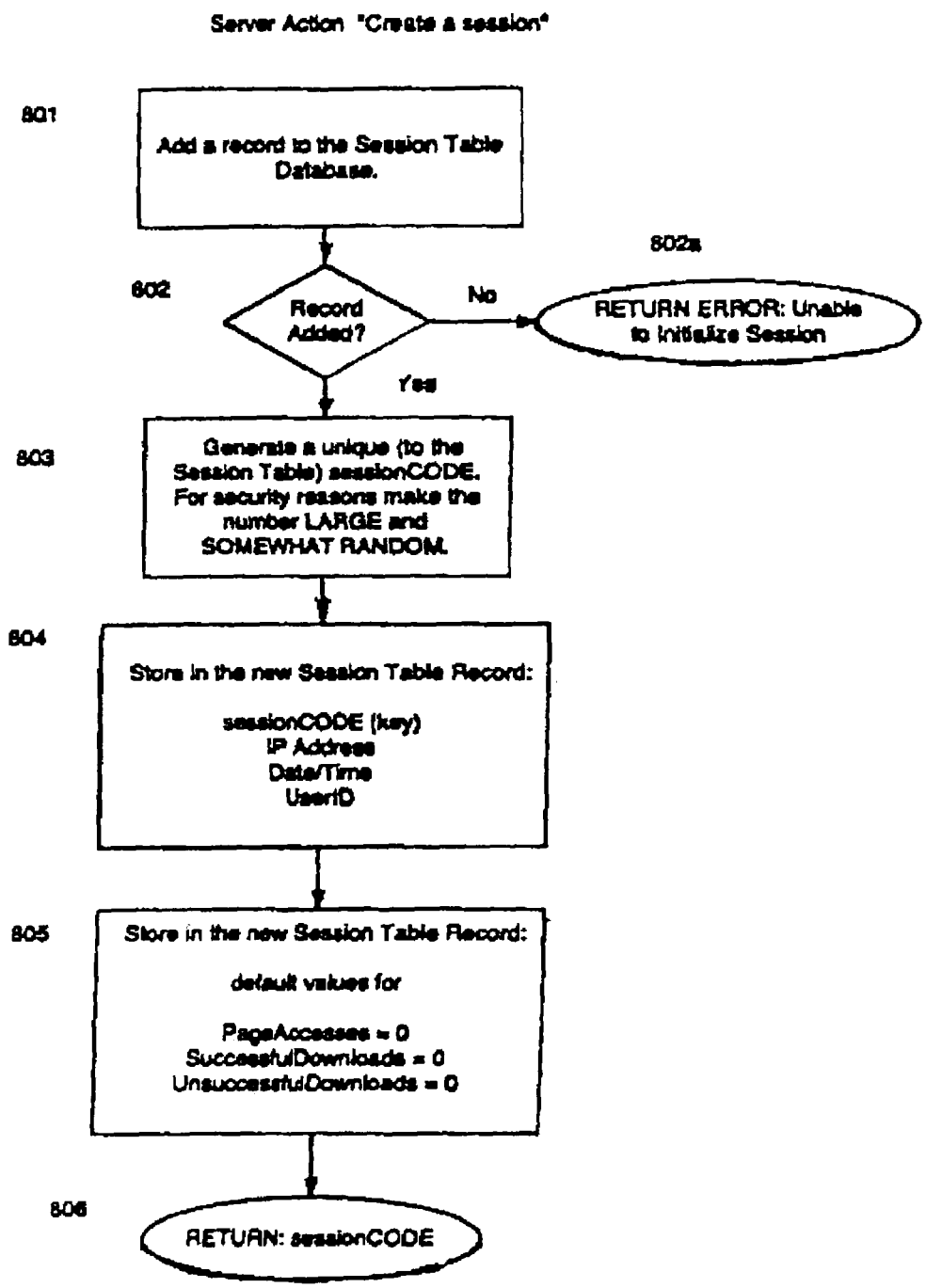

FIG. 8 shows one way that a server component may create a session, with a session being a method of keeping data for a specific user during the time they login until the time they log off the system. A session is useful to prevent the user from having to repeat actions such as those requiring identification. For example the user need only gives their user name once when using the program instead of before each and every action. A session is also useful to track a user's action for security purposes; for example to prevent two users from logging in with the same user ID (which would suggest a stolen username/password). A session is still further useful to keep track of who is online at any one time for administrative purposes.

In step 801 a new database entry in the session table is created to hold information regarding this session. In step 802 if there is no space or another database error occurs then the operation aborts in step 802a.

In step 803 a unique identifier is generated and stored as a "session code" or "sessionCODE". This identifier is used during the rest of the user's time period of interaction(session) with the server. For security reasons the unique identifier (sessionCODE) is preferably large and somewhat random in nature. This will help prevent guessing of sessionCODEs by unauthorized users.

In step 804 information regarding the user is stored in the database entry created in step 801. In step 805 values in the database entry that track user actions are initialized with default values.

In step 806 the server returns the unique identifier sessionCODE to the client application so the client can later send this reference with further inquiries.

This is generally an internal server function, and may be sent from another server operation that needs to create a session. For example when an existing user logs in or when a new user is created this subroutine is called.

Figure 9:
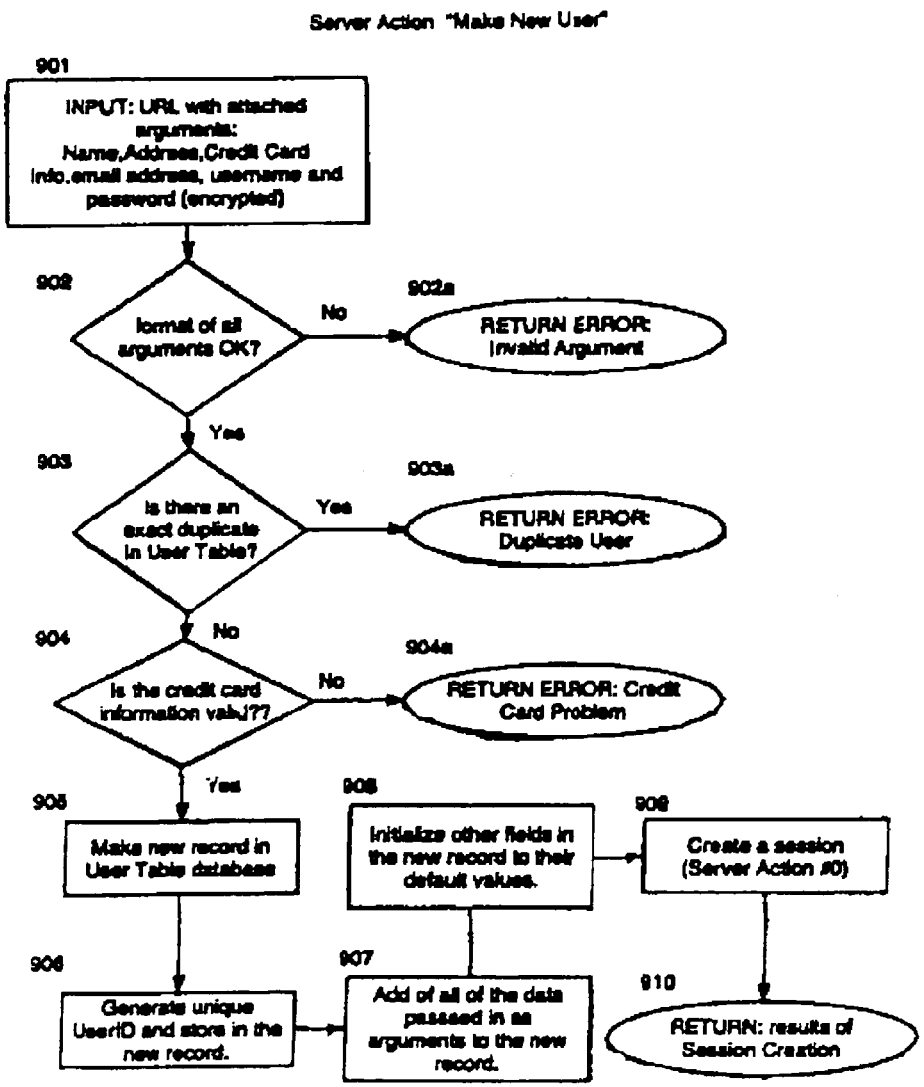

FIG. 9 shows an illustrative sequence of operations that occurs on the server to create a new user. Creation of a new user is initiated by someone using the client software for the first time. The client then stores the sessionCODE it gets back which is used to identify the user until they exit the client program or shutdown their system.

In step 901 the input arguments are described. They may include for example one or any combination of Billing Name, Billing AddressLine1, Billing AddressLine2, Billing City, Billing State, Billing Zip, Shipping Name, Shipping AddressLine1, Shipping AddressLine2, Shipping City, Shipping State, Shipping Zip, Card Type, Card Number, Card Expiration, Card Code, email address, username, or password.

In step 902 if the format of the arguments is not OK then action step 902a is taken and the server action is aborted with an error message. In step 903 the User Table portion of the database is checked for duplicate users. If one is found then in step 903a the server action is aborted with an error message. In step 904 a third party database is accessed and the credit card information is checked for authenticity. If the card is invalid or otherwise unusable then in step 904a the server action is aborted with an error message.

In step 905 a record is created in the User Table portion of the database. In step 906 a number unique to this user is generated and stored in the User Table record created in step 905. In step 907 the data from the arguments of step 901 are stored in the database record created in step 905.

In step 908 the server initializes other fields in the User Table database record that is created in step 905, such as one or any combination of (numbers in parentheticals being for illustration purposes): Login Created Date (to current date), Last Time Login Date (to current date), Number of Times Logged In (1), Number of Downloads (0), Number of Successful Charges (0), date of Last Successful charge (0), Last Rejected TransactionID (0), Number of UnSuccessful Charges (0), Date of Last Unsuccessful charge (0), Last Rejected TransactionID (0), SuggestedMediaIDs(6) (based on actors, genre etc. . . . ), lastIPAddresses[20] (all 0.0.0.0), IPAddressIndex, Last date/time, password sent to email, or Number of Times password sent to email.

In step 909 a session is created by calling the subroutine as described in FIG. 8. In step 910 the server operation completes with a message to the client that making the new user was successful.

Figure 10:
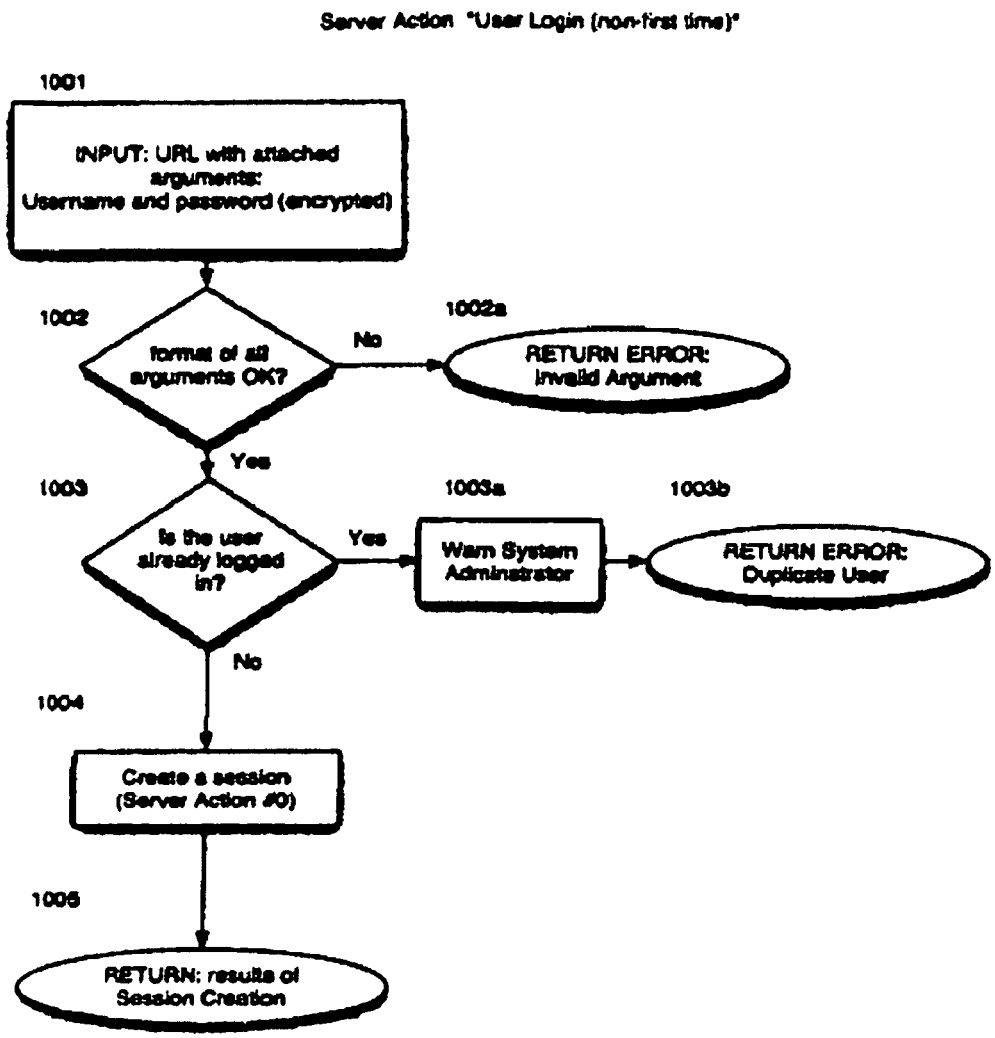
Figure 11:
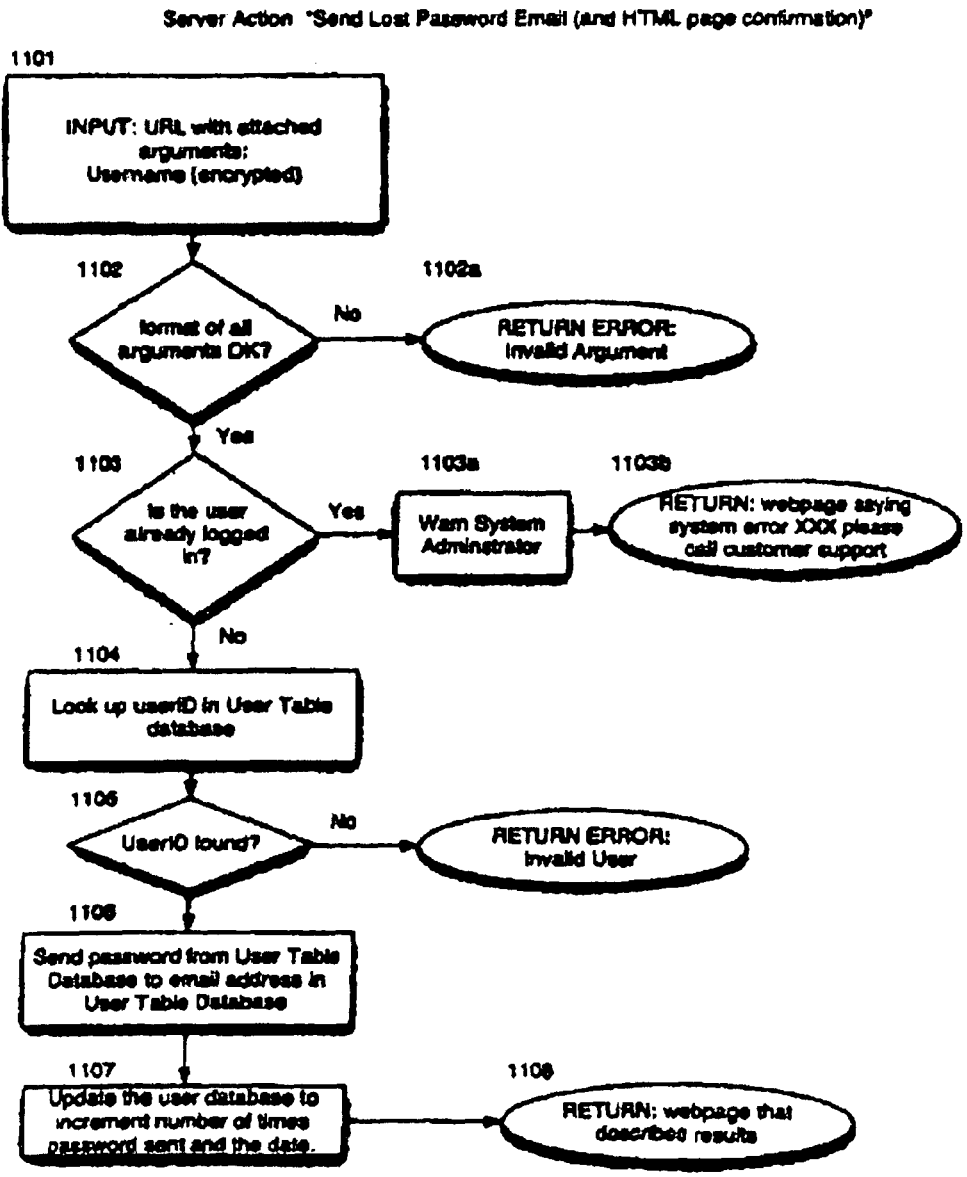

An example of the server transaction could be:
command to server from client: "www.download2disc.com/newuserphp?n=username...< all the parameters described in step 901 text description>"
response from server to client: "380203764622237788" which represents a sessionCODE FIG. 10 shows the sequence of one or a combination of operations that may occur on the server to authenticate a user login. A user generally will be authenticated every time it is run. A sessionCODE can thus be stored and used to identify the user until they exit the client program or shutdown of their system.

In step 1001 the input arguments are described. Username and password are passed in combined and encrypted. In step 1002, the data is optionally decrypted and if the format of the arguments is not OK then action step 1002a may be taken and the server action is aborted with an error message.

In step 1003 if the username is present in the list of sessions (user is online twice) then step 1003b is taken and the server action is aborted with an error message. Also per step 1003a, a warning to the system administrator might be made if a possible security breach is detected.

In step 1004 a session might be created by calling the subroutine as described in FIG. 8. In step 1005 the server operation can be completed, such as by a message that reflects whether the session was created in step 1004.

An example of the server transaction could be:
command to server from client: "www.download2disc.com/authenticate.php?n=username&p=928938912836541"
response from server to client: "380203764622237788" which represents a sessionCODE Turning to FIG. 11, there is shown an illustrative sequence of operations that occurs on the server to send a lost password email when the user requests one. In step 1101 the input is described. In step 1102, the data is decrypted and if the format of the arguments is not OK then action step 1002a is taken and the server action is aborted, possibly also delivering an error message.

In step 1103, if the username is present in the list of sessions (user is online twice) then step 1002a is taken and the server action is aborted, possibly also delivering an error message.

In step 1104, a username is looked up, such as in the User Table portion of the database, to find the user record. In step 1105 if a user name is not found, the server action can be aborted, possibly also delivering an error message.

In step 1106 an email message is generated and sent containing the password from the user table record to the email described in the user table record.

In step 1107 the user table is updated with messaging data, such as information about the "last date/time password sent to email". Other data can also be addressed, such as by incrementing "Number of Times password sent to email". This information thus can be used to discover security abuses of this operation. In step 1108 a result describing the success of step 1106 can be generated.

An example of the server transaction could be:
command to server from client: www.download2disc.com/lostpassword.php?n=username
response from server to client: webpage "email sent to your address we have on record. More info Cust. Service:313-555-1234"

Figure 12:
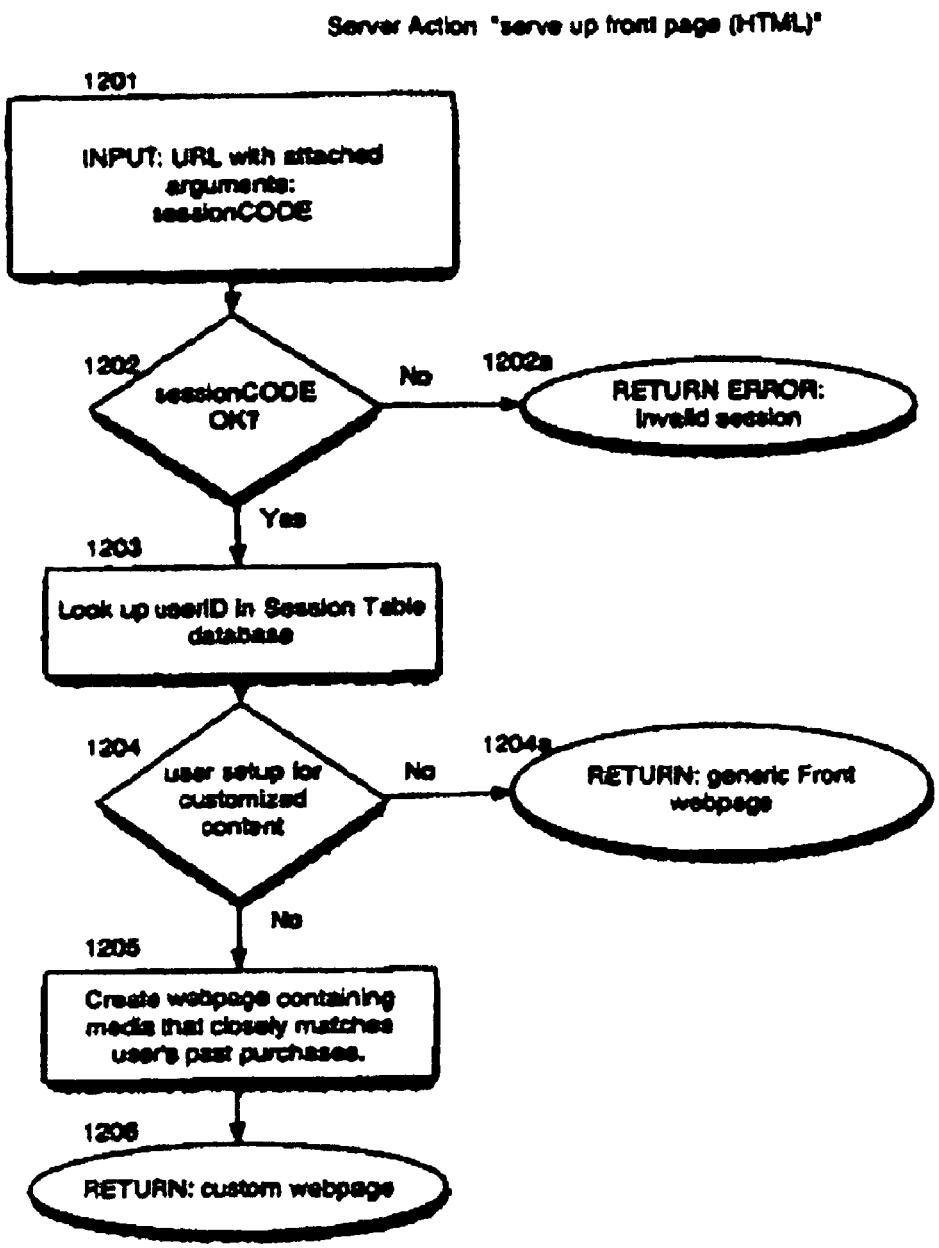

FIG. 12 shows the sequence of operations that occurs on the server to return a front page, such as by an HTML that displays the front page. In step 1201 the input is described it is just a sessionCODE. In step 1202 The sessionCODE is looked up in the Session Table portion of the database. If it is not found then action of step 1202a can be taken and the server action is aborted, such as with an error message, e.g., Invalid Session. In step 1203 the record in the Session Table matching the session code is located.

In step 1204, if the user is not set up for customized content the server returns a generic front page in step 1204a. Otherwise in step 1205 a custom webpage may be generated reflecting content that the company thinks is most appropriate for the user based on data collected about the user. In step 1206 the custom webpage HTML can be returned to the client for display.

Figure 13:
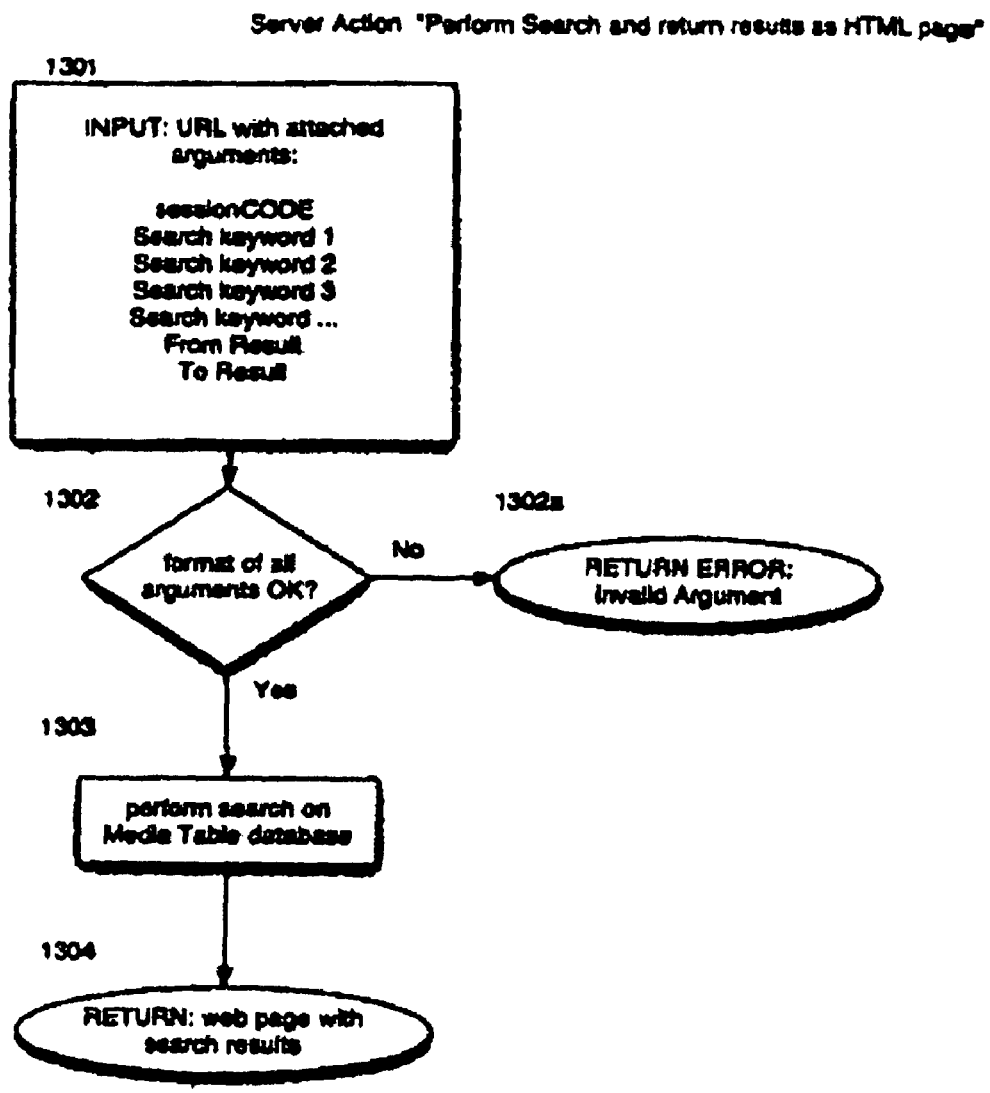

An example of the server transaction could be:
command to server from client: www.download2disc.com/front.php?s=380203764622237788
response from server to client: HTML webpage that contains links to suggested media for download FIG. 13 shows an illustrative sequence of operations that occurs on the server to perform a database search, such as a search based on a number of keywords. Per step 1301, arguments are described as sessionCODE, searchString and any number of keywords. A "from" and "to" range can also be specified to limit the number of results and/or spread them out over a number of HTML pages.

In step 1302 if the format of the arguments are not OK then action of step 1302a may be taken and the server action aborted with a suitable error message. In step 1303, a search of the Media Table portion of the database is conducted looking for matching keywords from arguments in step 1301. Per step 1304 an response, such as an HTML document, is returned with the search results for the range specified.

Figure 14:
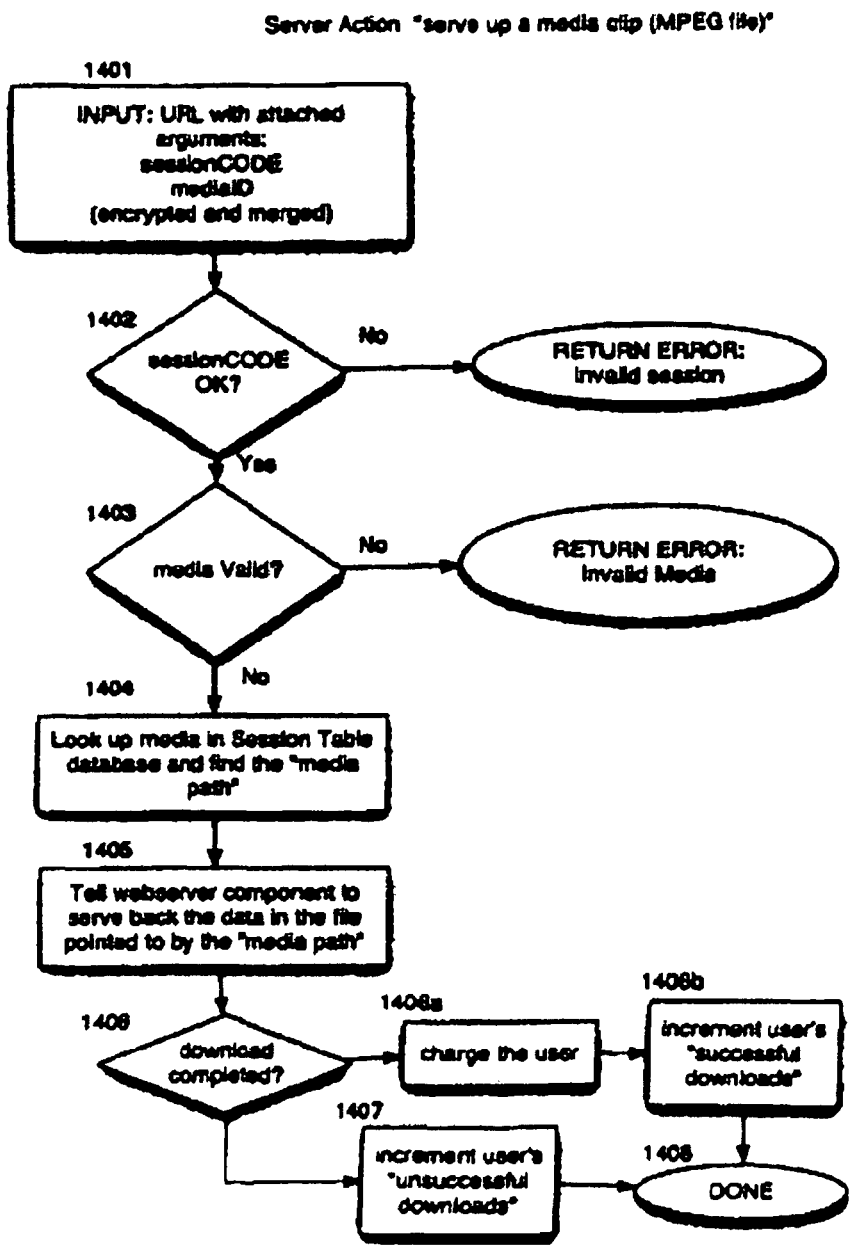

FIG. 14 shows an illustrative sequence of operations that can occur on the server to serve up adult digital content, such as a media clip. In step 1401 arguments are described as sessionCODE, and a mediaID. The client passes these in. The client usually gets the mediaID from links on the front page and search results pages.

In step 1402 if sessionCODE is invalid (not found in Session Table) then action step 1402a is taken and the server action is aborted with a suitable error message, e.g., Invalid Session. In step 1403 if mediaID is invalid (not found in Media Table) then action step 1403a may be taken and the server action is aborted with a suitable error message, e.g., Invalid Media. In step 1404 using the mediaID a server file path to the requested media is found in the Media Table portion of the database. In step 1405, the webserver component begins sending the file at the path from step 1404 to the client.

In step 1406 if the download completes then step 1406a the user is charged for the download (though charging may occur prior to the same), and per step 1406b the user's successful download count is incremented. Upon arriving at step 1408, the action is concluded and system may return to client.

Otherwise per step 1407 a user's unsuccessful download count may be incremented. Lastly step 1408 the action is concluded and system may return to client, which will notice the incomplete download and could report an error.

An example of the server transaction could be:
command to server from client: www.download2disc.com/download.php?s=380203764622237788&m=0120301&key=993349
374552662
response from server to client::<MPEG download stream>

Figure 15:
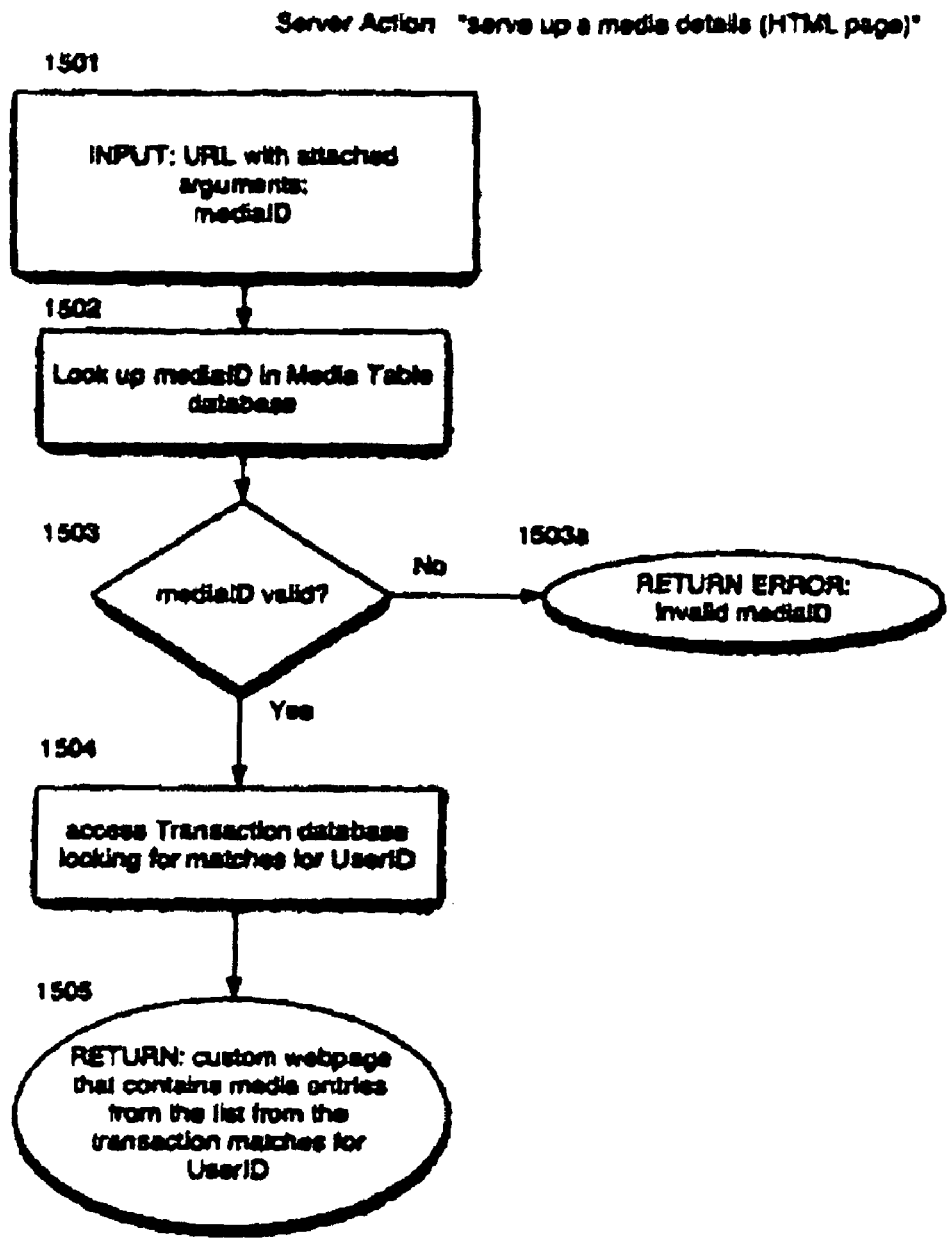

FIG. 15 shows an example of a sequence of operations that could occur on the server to serve up a data description page, such as an HTML media description page. In step 1501 the input is described as a mediaID. In step 1502, the mediaID is looked up in the Media Table portion of the database. In step 1503, if the MediaID is not found in step 1502 then action of step 1503a is taken and the server action is aborted, preferably with a suitable error message such as Invalid MediaID.

In step 1504, one or more records that match the MediaID is then accessed. Thumbnails, dates of production, or other descriptive information are gathered and form the content of an HTML page that gives a description of the media. In step 1505 the HTML page is returned to the client for display.

Figure 16:
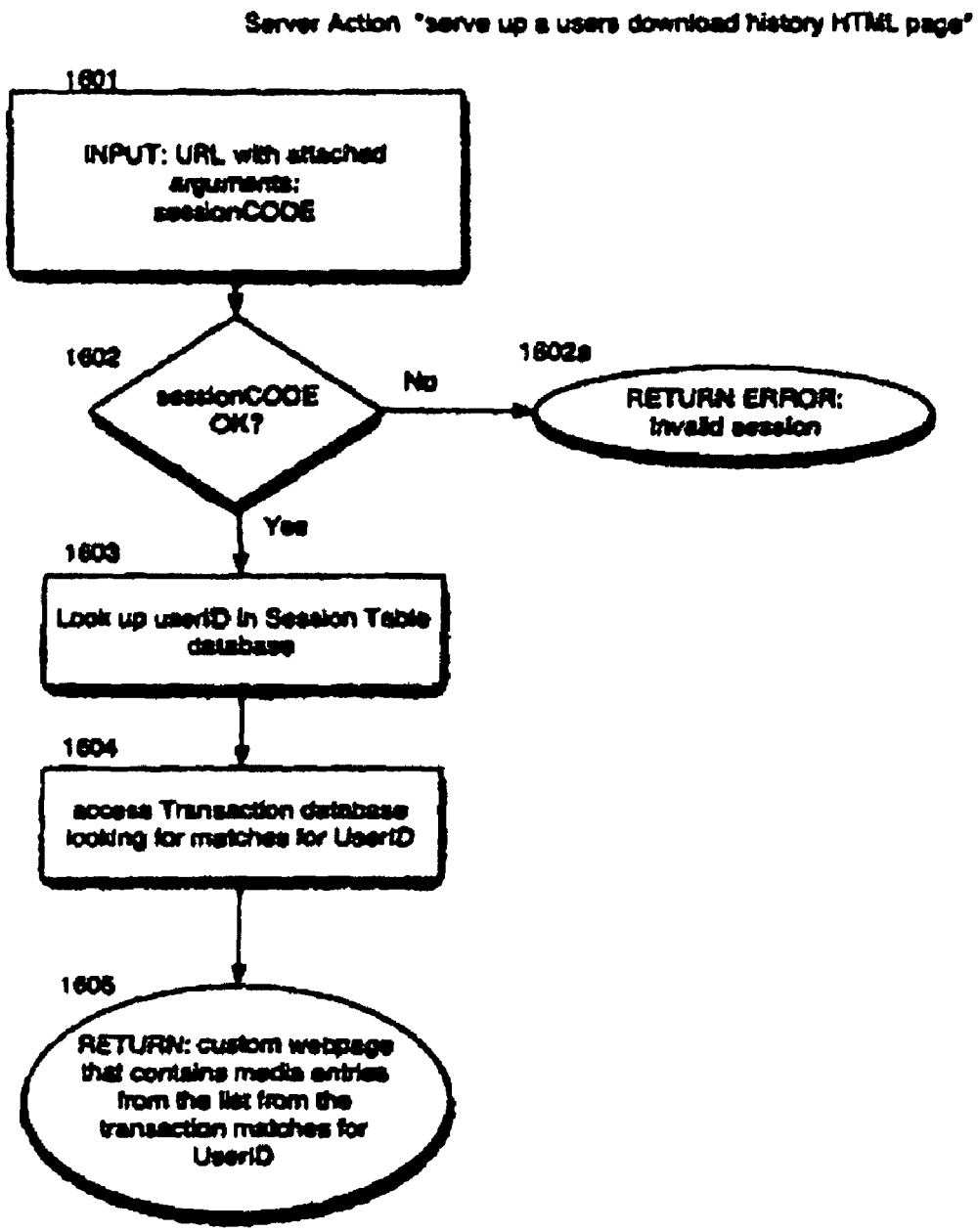

FIG. 16 shows an example of a sequence of operations that occurs on the server to serve up an optional user download history page, e.g., an HTML page that lists all of the downloads a user has made since they started using the product, during a specific time period, or otherwise.

In step 1601 the input is described as a sessionCODE. In step 1602 the sessionCODE is looked up in the Session Table portion of the database. If it is not found then the action of step 1602a is taken and the server action is aborted, preferably with a suitable error message such as Invalid Session.

In step 1603 the UserID is extracted from the SessionCODE using the Session Table portion of the database. In step 1604 the Transaction Table portion of the database is accessed and searched for occurrences of the UserID corresponding with previous downloads.

In step 1605 the results are returned to client, such as by an HTML web page. Displaying the HTML results a list of media the user can "re"-download.

Figure 17:
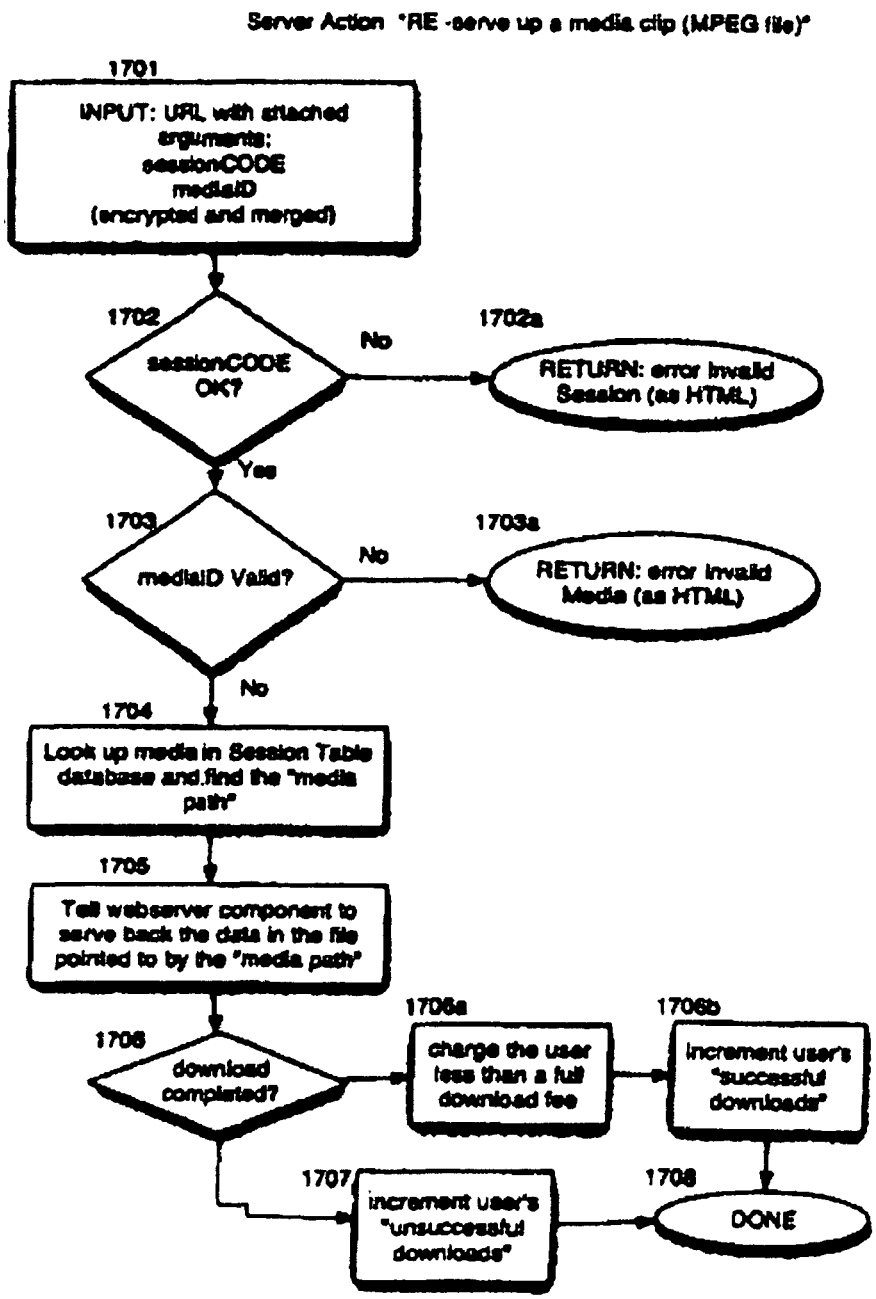

FIG. 17 shows an example of a sequence of operations that may occur on the server to repeating a serve up of a file such as a media clip, such as if a user loses their media file (in which case, the user might be able to re-download the file for a fee, for free, or possibly for a reduced price). The steps of FIG. 14 may then be re-executed, with the same or a different price for the download.

Per step 1701 arguments are described as sessionCODE, and a mediaID. The client passes these in. The client usually gets the mediaID from links on the front page and search results pages. In step 1702 if sessionCODE is invalid (not found in Session Table) then action of step 1702a is taken and the server action is aborted, possibly with a suitable error message.

In step 1703 if mediaID is invalid (not found in Media Table) then action of step 1703a is taken and the server action is aborted, possibly with a suitable error message. In step 1704 the mediaID a server file path is used to find the requested media in the Media Table portion of the database.

In step 1705 the webserver component begins sending the file at the path from step 1704 to the client. In step 1706, if the download completes, then in step 1706a the user is charged for the download and step 1706b the user's successful download count is incremented. Lastly, per step 1708 the action is concluded and system may return to client, which will notice the incomplete download and could report an error. Otherwise in step 1707 the user's unsuccessful download count is incremented. Per step 1708, the action is concluded and system may return to client, which will notice the incomplete download and could report an error.

An example of the server transaction could be:
command to server from client: www.download2disc.com/redownload.php?s=380203764622237788&m=0120301&key=9933
49374552662
response from server to client::<MPEG download stream>

Various other features are contemplated as within the present invention, including digital rights management. Thus, there may be a step employed of restricting the ability of the user to copy downloaded files, the manner of their use, dissemination to others, the ability to transfer license rights in content between users, combinations thereof or the like. See, e.g., U.S. Patent Application Nos. 20030079133 (Breiter) and 20030131252 (Barton). Users may also be able to access a framework by which a coupon, gift certificate or other approach to offering a price reduction might be employed. Thus one possible step of the invention includes offers a price reduction to a user.

In one aspect the present invention also contemplates a method of doing business by which the identity of users of the software, network or Internet website of the present invention will be provided for consideration to adult digital content providers, thus enabling direct communication between the content providers and the user. The network component may also be a vehicle for providing advertising to users. Alternatively, it is expected that a number of users will want to maintain their privacy or access adult digital content without the common resulting unsolicited messages, banner advertisements, pop-up advertisements or the like resulting from cookie detection. Thus, one aspect of the invention contemplates providing a module that a user can elect that would prevent cookie detection, filter unsolicited messages, banner advertisements, pop-up advertisements from undesired content providers, or any combination thereof.

Other features may be incorporated in accordance with the present invention including for example a software, method or system might incorporate methodology to help a user formulate a search query. See, e.g., U.S. Pat. No. 6,671,681 (Emens et al). The system might include a framework or module for tracking user activity (e.g., by compiling lists of user queries, by tracking hits on certain topics, by tracking downloads, by tracking most times of user activity, any combination thereof or otherwise).

The website of the present invention may also be adapted for providing and maintaining a directory for facilitating peer-to-peer sharing of files. An example of one such system is disclosed without limitation in U.S. Patent Application Publication No. 20030225796 (Matsubara). According to another possible approach, it is possible to select an icon representative of a file under consideration and a compressed sample is made and sent to a selected recipient, e.g., via an email with an accompanying message. This may be done while the video is playing or upon conclusion. U.S. Pat. No. 6,670,537 (Hughes et al) illustrates an example of one possible system, in the context of music files, which is believed adaptable to facilitate such an operation in accordance with the present invention.

Yet another aspect of the present invention contemplates offering a user a data warehouse site remote from a user personal-controlled storage medium, where the user can store downloaded files for later retrieval over the internet. In this manner, the user need not consume vast amounts of storage space on the user's own computer, but yet still have access to files the user has acquired rights to use.

As can be seen from the above, the system and method (including any software (e.g., Windows-based or otherwise)) of the present invention provides users access to an extensive internet data base of adult digital content, particularly video files. The system and method of the present invention allows the user to browse one or more data bases, and for a fee, download content to his/her computer. Once downloaded, the user can view the content in at least one of at least three ways, specifically, on a local computer via a built in video player associated with the system; by "burning" the content to vcd and playing it on a conventional vcd/dvd player; or by "transferring" the content to an MPEG player, or any combination thereof. As noted, any of a number of different approaches to offering the system and method commercially might be employed. For example, in one embodiment, software is offered at no charge (or a nominal fee) as is browsing of the data base, with the user paying for downloads. The data bases associated with the present invention of adult video content could be produced by the operator of the method and system, or acquired from third party vendors who might be paid or themselves pay to include their files in the data base.

Because access to the one or more databases is restricted, users optionally can be required to accept certain terms and conditions for using the software to access the data base. For example, the terms may include a representation that the user is of legal age to view and purchase adult content. Users are also optionally provided an opportunity to establish an on line account. For example, if a user elected to not pursue an option of charging a credit card or the like for each purchase, one approach contemplates establishing an account into which a user can deposit funds (e.g., via a credit card), which will be debited for each purchase.

Once access is established, users have the ability to display information about the content they want to see, including "thumbnail" still images which are representative of the video content available to download. The adult digital content is indexed in several ways designed to assist users with finding the specific type of adult digital content they want to view or download. The method and system allows users to enter "personal" search criteria, to select from the software's built in menu of distinct search criteria, or both. The method and system of the present invention also contemplates employing a framework pursuant to which user selection history is analyzed and employed to formulate recommendations for selections to the user, whether requested by the user, unsolicited or both.

The matching search results are initially displayed as a list of files, optionally accompanied by a brief text description of each file and one or more thumbnail images (e.g., a still image, a motion image or combination thereof) from each file. For more detailed information and more thumbnail still images of any particular file, the user may be able to simply click on the applicable thumbnail. From there, one additional click on the "download" icon is all that is required to purchase and download that video. Downloaded content can be viewed via the software's built in video player, burned to vcd, transferred to an MPEG player, or otherwise, whether for a fee or at no additional charge.

Among other attributes, what makes the system and method of the present invention software unique is a custom approach for integrating adult video content viewing, vcd burning, portable player support, file management, on line consumer electronic shopping, or any combination thereof, into one package. The novel integration of the many "tools" needed to accomplish the innovative media tasks makes the system, method and associated software easy to use for even a computer novice. The integration of these tools also offers users are assured fast, high quality, reliable downloads in the privacy of their own personal environment and at a fraction of the price to buy similar adult video content in stores or by mail.

The present invention contemplates application of the methods, systems or both in connection with the distribution of adult digital content. However, application of the invention is not limited to such content, but can be extended to other content or media forms as well, such as music videos.

The following further illustrates operation of the method and system of the present invention. It is illustrative only and not intended as limiting, as it is believed that the functions performed and the results obtained are achievable through other similar approaches as well.

Example 1

The following Example illustrates one possible approach to implementing the present invention and particularly addresses how a network component operator would operate a server for interaction with a user via one or more user interfaces.

---

Server Action #1 - make new user (first time)

input:
    Billing Name
    Billing AddressLine1
    Billing AddressLine2
    Billing City
    Billing State
    Billing Zip
    Shipping Name
    Shipping AddressLine1
    Shipping AddressLine2
    Shipping City
    Shipping State
    Shipping Zip
    Card Type
    Card Number
    Card Expiration
    Card Code
    email address
    username -continued

| Server Action #1 - make new user (first time) |
| --- |
| password
output: sessionCODE (from authentication)
actions:
   verify all fields enetered correctly.
   verify valid credit card.
   make new record for user table
   fill in all the data from input
   Make new unique UserID and store in field
     UserID
   initialize these user table fields
     Login Created Date (to current date)
     Last Time Login Date (to current date)
     Number of Times Logged In (1)
     Number of Downloads (0)
     Number of Succesful Charges (0)
     Date of Last Successful charge (0)
     Last Rejected TransactionID (0)
     Number of UnSuccesful Charges (0)
     Date of Last Unsuccessful charge (0)
     Last Rejected Transaction ID (0)
     SuggestedMediaIDs(6) (based on actors, genre etc . . . )
     LastIPAddresses[20]   (all 0.0.0.0)
     IPAddressIndex
     Last date/time password sent to email
     Number of Times password sent to email
   perform authentication and return the sessionCODE
inputURL: www.download2disc.com/newuser.php?n=username&. . .
wow will this be long
outputTEXT: 380203764622237788 |

| Server Action #2 - authenticate user (non-first time) |
| --- |
| input: username
input: password (hash?)
output: sessionCODE
inputURL:
www.download2disc.com/authenticate.php?n=username&p=
928938912836541
outputTEXT: 380203764622237788
actions:
   make new record for Session Table
     make large unique number for sessionCODE
     log sessionCODE
     log IP code
     log date/time
     find UserID - log it
     set PageAccesses to 0
     set SuccessfulDownloads to 0
     set UnsuccessfulDownloads to 0
   update User Table
concern: can sessionCODE be guessed? |

| Server Action #3 - send lost password email |
| --- |
| input: username
output: webpage
output: email message
inputURL: www.download2disc.com/lostpassword.php?n=username
outputHTML: (webpage) "email sent to your address we have on record.
More info Cust. Service:313-555-1234"
actions:
   send the email
     email address from user table
     update user table
        Last date/time password sent to email
        Number of Times password sent to email
concern: faked request
concern: intercepted emails |

| Server Action #4 - serve up front page |
| --- |
| input:sessionCODE output:webpage
inputURL: www.download2disc.com/front.php?s=380203764622237788
outputHTML: webpage (pretty much canned HTML for now)
concern: serve up individualized content? or will that piss people off? |

| Server Action #5 - perform search |
| --- |
| input:sessionCODE
input:searchstring
input:combo1value
input:combo2value
input:combo3value
input:combo4value
input:combo5value
input:combo6value
output:webpage
inputURL:
www.download2disc.com/search.php?s=380203764622237788&s0=
"Jenna":s1=0;s2=0;s
3=0;s4=0;s5=0;s6=0;from=0;to=25
outputHTML: search result webpage for <from>-<to>range
actions:
   Perform MySQL search matching the keywords
   Return webpage with results
concern: systematic stealing of which content we provide? |

| Server Action #6 - get detail on clip |
| --- |
| input:sessionCODE input:mediaID output:webpage
inputURL:
www.download2disc.com/details.php?s=380203764622237788&m=
0120301
outputHTML: details webpage. Metadata and thumbnails on the
webpage.
actions:
   Perform MySQL search for MediaID
   Make webpage with media details and thumnails
concern: systematic stealing of our "meta-data" (info about videos) |

| Server Action #7 - serve up a clip (user download) |
| --- |
| input:sessionCODE
input:mediaID
input:encoded key (sessionCODE,mediaID)
output:<MPEG download stream>
inputURL:
www.download2disc.com/download.php?s=
380203764622237788&m=0120301&key=993349
374552662
outputBINARY:<MPEG download stream>
concern: check for full download, handle partial download
concern: user attempts partial downloads to avoid fees
concern: guessed sessionCODE to steal download
concern: intercepted sessionCODE to steal download |

| Server Action #8 - show history of a user's downloads |
| --- |
| input:sessionCODE
inputURL:
www.download2disc.com/downloadhistory.php?s=
380203764622237788&from=0;to=25
outputHTML: web page listing media downloads with dates & link to "re"- |

| Server Action #8 - show history of a user's downloads |
| --- |
| serve the file
Find the user from the sessionCODE
search media transactions for userID
Display List broken up by 1-25, 26-50, 51-75 . . .
concern: privacy? |

| Server Action #9 - re-serve up a clip (downloaded of content they bought before) |
| --- |
| input:sessionCODE
input:mediaID
output <MPEG download stream>
inputURL:
www.download2disc.com/redownload.php?s=
380203764622237788&m0120301&key=9933
49374552662
outputHTML:<MPEG download stream>
concern: "re"-serving for other users besides the original
concern: other stealing |

Example 2

The following are illustrative of database tables and fields that might be employed in connection with a network component of the present invention, such as for use with the above Example 1.

| Users Table |
| --- |
| UserID
Login Created Date
Last Time Login Date
Number of Times Logged In
Number of Downloads
Billing Name
Billing AddressLine1
Billing AddressLine2
Billing City
Billing State
Billing Zip
Shipping Name
Shipping AddressLine1
Shipping AddressLine2
Shipping City
Shipping State
Shipping Zip
Card Type
Card Number (encrypt?)
Card Expiration (encrypt?)
Card Code (encrypt?)
email address
Number of Succesful Charges
Date of Last Successful charge
Last Rejected TransactionID
Number of UnSuccesful Charges
Date of Last Unsuccessful charge
Last Rejected TransactionID
SuggestedMediaIDs[6](based on actors, genre etc . . . )
LastIPAddresses[20]
IPAddressIndex
Last date/time password sent to email
Number of Times password sent to email
Session Table |
| SessionCODE (unique big number - reliably random)
UserID
IP Address |
| DateTime
PageAccesses
SuccessfulDownloads
UnsuccessfulDownloads
Media Table |
| MediaID
Short Description
Long Description
Publisher
Date of production
Date added to database
Actors
Total number of downloads
Thumbnails (array of 64?)
People also bought (array of 5?)
Current Rating
"Aged" Number of Downloads
"Aged" Rating
Keywords (long string ? array?)
Specific Properties
   Hard/Soft/No nudity
   Gay/Bi/Hetero/Lesbian/Transgender/NA
   Latin/Ebony/Interracial . . . /NA
   Shaved/Hairy/NA
   Amature/Professional/NA
   more . . .??
Media Transactions (download purchases) Table |
| TransactionID
UserID
MediaID
Date/Time
TransactionNumber (from credit card company)
Amount charged
Tax charged
Number of Download Attempts
Successful (bool)
"Aged" Media Transactions Table (used for backup and archiving)
<Same as Media Transactions Table>
<Media transactions "emptied" into an aged archive once a month or once a quarter>
Merchandise Transactions Table (store purchases of hardware/accessories)
MerchandiseTransactionID
UserID
array of productIDs purchased
Date/Time
Amount charged
Tax charged
"Aged" Merchandise Transactions Table (used for backup and archiving)
<Same as Merchandise Transactions Table>
<Merchandise transactions "emptied" into an aged archive once a month or once a quarter> |

It will be further appreciated that functions or structures of a plurality of components or steps may be combined into a single component or step, or the functions or structures of one step or component may be split among plural steps or components. The functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to a website. In this instance, the website may include program logic to enable the website to communicate with the externally implemented components, modules, and databases to perform the functions as disclosed herein. The present invention contemplates all of these combinations.

In addition, while a feature of the present invention may have been described in the context of only one of the illustrated embodiments, such feature may be combined with one or more other features of other embodiments, for any given application. It will also be appreciated from the above that the use of the unique systems herein and the operation thereof also constitute methods in accordance with the present invention.

Descriptions herein to a multi-tier client/server architecture (e.g. in the context of operations performed by the network website component) are illustrative and do not preclude the use of other forms of architecture, such as where client and server functions are combined to a single computer or spread over a plurality of computers, including for example two or more computers (e.g. servers), a transaction processing monitor (e.g. TP monitor server, messaging server, application server, or any combination thereof).

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications referred to in the above text, are incorporated by reference for all purposes.

What is claimed is:

1. An integrated electronic information system, comprising:
   a) at least one user interface adapted for interaction with a user;
   b) at least one database associated with a server that is remotely accessible by the user, the database comprising adult digital content;
   c) a login screen so that the user is granted access to the at least one database through the at least one interface;
   d) a network, that functions to maintain the at least one database of adult content, update the at least one database of adult content, and provide access to users so that the users can view and manage the content on the at least one database, for providing remote access to the at least one database by the user to enable downloading of the adult digital content, wherein the network is the internet;
   e) a content provider; wherein the content provider includes a digital rights management framework, which restricts the ability of the user to copy downloaded adult digital content, the manner of use of adult digital content, the ability to transfer license rights in content between users, or a combination thereof;
   f) a portable media player for synchronizing with a computer that displays the at least one user interface;
   g) a virtual storefront, wherein a plurality of adult digital content resources can be accessed anonymously through the virtual storefront, and during or prior to downloading adult digital content the user is charged for downloading the adult digital content;
   wherein personal search criteria is entered by selecting keywords from the database's built in menu;
   wherein the prevention of cookie detection, filter unsolicited messages, banner advertisements, pop-up advertisements from undesired content providers, or any combination thereof is elected;
   wherein goods or services can be purchased via the network that are offered for sale either by the network component host, a third party vendor, or a combination thereof;
   wherein the adult digital content is provided in MPEG-1 files, and the MPEG-1 files can be synchronized with a portable media player;
   wherein the adult digit content is capable of being archived unto the storage medium, the storage medium is selected from a hard disk, a floppy disk, a DVD, a CD, a magnetic recording tape, an optical recording device, a memory card, a memory stick, a flash storage medium, a memory key device, or any combination thereof;
   wherein files are provided by the content provider; and
   wherein the virtual storefront is used as a portal for accessing the files.

2. The system of claim 1, further comprising:
   a video viewer accessible through the at least one user interface;
   wherein the video viewer is connected to peripheral output devices; and
   wherein the at least one database includes a plurality of adult digital content files and a plurality of links to other files.

3. The system of claim 1, wherein the system further comprises at least one framework for maintaining privacy and access to adult digital content without resulting unsolicited messages, banner advertisements, pop-up advertisements, or any combination thereof.

4. The system of claim 1, wherein the system further comprises:
   a security framework for preventing access to the at least one database to an unauthorized user, an establishment framework, an account payment framework, or a combination thereof.

5. The system of claim 1, wherein the at least one user interface is associated with a user computer and the user computer is a personal media player having an interface for permitting it to directly access the network.

6. The system of claim 1, further comprising:
   a framework for facilitating purchase of goods and a framework for storing user selections for future reference;
   wherein the at least one database associated with a server includes a plurality of databases, a plurality of servers, or a combination thereof.

7. The system of claim 1, further comprising:
   a framework for providing selection recommendations to a user based upon popularity of one or more selections, the selection history of the user, or a combination thereof.

8. The system of claim 1, wherein the digital rights management framework includes a rights management interface to digital information, a server that is remotely accessible, and a network for providing remote access to the server.

9. The system of claim 8, wherein the computer contains program logic so that representing data and instructions can govern computer operation and the program logic has one or more objective frameworks or modules that reside on an addressable storage medium and execute on at least one processor, and
   wherein the frameworks or modules include items selected from the group of hardware components, software components, object-oriented software components, class components, task components, drivers, firmware, microcode, circuitry segments of program code, subroutines, functions, attributes, data, databases, data structures, tables, arrays, variables, or any combination thereof.

10. The system of claim 1, further comprising:
at least one framework for maintaining privacy and access to adult digital content without resulting unsolicited messages, banner advertisements, pop-up advertisements, or any combination thereof, and
a framework for providing selection recommendations to a user based upon popularity of one or more selections, the selection history of the user, or a combination thereof.

11. The system of claim 10, further comprising:
a user history display so that the user can view selections, downloads, or both, with the ability to access such selections, downloads, or both for further viewing,
wherein the virtual storefront is a portal for obtaining access to files of the content provider.

12. A method for accessing adult content electronic information, comprising the steps of:
providing an integrated electronic information system;
providing a user interface to a user over a network, wherein the network is the internet;
maintaining a database of adult digital content;
logging in with a unique identifier, wherein the user is required to accept terms and conditions representing that the user is of legal age to view and purchase adult content;
storing the unique identifier of a new user or comparing the unique identifier to a previously stored unique identifier so that authenticity is assured;
granting access to the user to the database for allowing the user to sample the adult digital content and select content for downloading by the user to a user managed storage medium;
transferring the digital content to the user for downloading by the user;
charging the user during or prior to transferring the digital content to the user;
browsing files stored on a server controlled by a content provider, wherein the server controlled by the content provider includes a digital rights management framework;
restricting the ability of the user to copy downloaded files, the manner of their use, dissemination to others, the ability to transfer license rights in content between users, or a combination thereof by using the digital rights management framework;
entering personal search criteria by selecting keywords from the database's built in menu;
electing to prevent cookie detection, filter unsolicited messages, banner advertisements, pop-up advertisements from undesired content providers, or any combination thereof; and
purchasing goods or services, wherein goods or services can be purchased via the network that are offered for sale either by the network component host, a third party vendor, or a combination thereof;
providing the adult digital content in MPEG-1 files, wherein the MPEG-1 files can be synchronized with a portable media player;
archiving the adult digit content unto the storage medium, the storage medium is selected from a hard disk, a floppy disk, a DVD, a CD, a magnetic recording tape, an optical recording device, a memory card, a memory stick, a flash storage medium, a memory key device, or any combination thereof; and
accessing files provided by the content provider, wherein the virtual storefront is used as a portal for accessing the files;
wherein the integrated electronic information system comprises:
a) at least one user interface adapted for interaction with a user;
b) at least one database associated with a server that is remotely accessible by the user, the database comprising adult digital content;
c) a login screen so that the user is granted access to the at least one database through the at least one interface;
d) a network for providing remote access to the at least one database by the user to enable downloading of the adult digital content, wherein the network is the internet;
e) a content provider; wherein the content provider includes a digital rights management framework, which restricts the ability of the user to copy downloaded adult digital content, the manner of use of adult digital content, the ability to transfer license rights in content between users, or a combination thereof;
f) a portable media player for synchronizing with a computer that displays the at least one user interface; and
g) a virtual storefront, wherein a plurality of adult digital content resources can be accessed anonymously through the virtual storefront.

13. The method of claim 12, further including the step of archiving the adult digit content unto the user managed storage medium, wherein the user managed storage medium is selected from a hard disk, a floppy disk, a DVD, a CD, a magnetic recording tape, an optical recording device, a memory card, a memory stick, a flash storage medium, a memory key device, or any combination thereof.

14. The method of claim 12, further comprising the steps of:
entering personal search criteria by selecting keywords from the database's built in menu, and
purchasing goods or services.

15. The method of claim 12, further comprising the step of electing to prevent cookie detection, filter unsolicited messages, banner advertisements, pop-up advertisements from undesired content providers, or any combination thereof.

16. The method of claim 12, wherein goods or services can be purchased via the network that are offered for sale either by the network component host, a third party vendor, or a combination thereof.

17. The method of claim 12, further comprising the step of:
searching a plurality of adult content sources on the network with as little as one search query or menu selection made by the user, wherein the network includes a database of adult content, which is available from the plurality of adult content sources.

18. An integrated electronic information system comprising:
a) a user module further comprising:
i. at least one user interface adapted for interaction with a user and the at least one user interface is associated with a user computer, wherein the user computer is a personal media player having an interface for permitting it to directly access the internet, and
ii. a portable media player for synchronizing with the user computer that displays the at least one user interface;
b) a plurality of third-party content providers further comprising:
i. at least one third-party database of adult content, wherein personal search criteria is entered by selection keywords from the at least one third-party database and ii. a digital rights management framework, wherein the digital rights management framework restricts the ability of the user to copy downloaded adult content, the manner of use of adult content, the ability to transfer license rights in content between users, or a combination thereof;

c) a network module further comprising:

i. at least one database of adult content, wherein the user can conduct a search of the at least one database of adult content using personal search criteria by entering a selection of keywords and the selection of keywords are stored for later retrieval;

ii. a login screen so that the user is granted access to the at least one database through the at least one user interface, wherein a unique identifier is compared to a previously stored unique identifier so that authenticity is assured;

iii. a server that is remotely accessible by a user and provides access to the at least one database;

iv. a virtual storefront for anonymously accessing a plurality of adult content resources, wherein the user conducts searches of the plurality of third-party content providers' database of adult content, stores selections from the at least one third-party database in the at least one database of adult content, and obtains digital rights to obtain the adult content from the at least one third-party content provider;

v. an account payment framework, wherein adult content can be purchased via the network module that are offered for sale by the network component host, a third party vendor, or a combination thereof so that upon payment the adult content and the digital rights are transferred to the user;

vi. a display so that the user can access a thumbnail image of the adult content prior to downloading the content from the third-party content provider;

vii. a framework for maintaining privacy and access to adult content without resulting in unsolicited messages, banner advertisement, pop-up advertisements, or any combination thereof wherein the virtual storefront is capable of synchronizing with the personal media player; and wherein the user computer is capable of archiving the adult content unto a storage medium, and the storage medium is selected from a hard disk, a floppy disk, a DVD, a CD, a magnetic recording tape, an optical recording device, a memory card, a memory stick, a flash storage medium, a memory key device, or any combination thereof.

* * * * *